(12) United States Patent
Feng

(10) Patent No.: US 10,798,081 B2
(45) Date of Patent: *Oct. 6, 2020

(54) METHOD, APPARATUS, AND SYSTEM FOR PROVIDING A SECURITY CHECK

(71) Applicant: Alibaba Group Holding Limited, George Town (KY)

(72) Inventor: Jinggang Feng, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/171,186

(22) Filed: Oct. 25, 2018

(65) Prior Publication Data
US 2019/0068571 A1    Feb. 28, 2019

Related U.S. Application Data

(63) Continuation of application No. 15/667,262, filed on Aug. 2, 2017, now Pat. No. 10,158,621, which is a
(Continued)

(30) Foreign Application Priority Data

May 22, 2014    (CN) .......................... 2014 1 0219868

(51) Int. Cl.
*H04W 12/06* (2009.01)
*H04L 29/06* (2006.01)
(Continued)

(52) U.S. Cl.
CPC ......... *H04L 63/08* (2013.01); *G06Q 20/3276* (2013.01); *G06Q 20/388* (2013.01);
(Continued)

(58) Field of Classification Search
CPC ... H04L 63/08; H04L 63/0876; H04L 9/3297; H04L 63/12; H04L 63/10; H04L 9/3226;
(Continued)

(56) References Cited

U.S. PATENT DOCUMENTS 6,928,558 B1 *    8/2005    Allahwerdi ............. G06F 21/31
                                                                        726/9
7,568,221 B2 *    7/2009    Matsui .................. H04N 5/765
                                                                        726/8
(Continued)

FOREIGN PATENT DOCUMENTS

JP    2010211294 A    9/2010
JP    4809723          11/2011
WO    WO-2009011436   1/2009

OTHER PUBLICATIONS

Kalpesh Adhatrao, Aditya Gaykar, Rohit Jha, Vipul Honrao, "A Secure Method for Signing in Using Quick Response Codes With Mobile Authentication", Mar. 2013, International Journal of Student Research in Technology & Management vol. 1(1) p. 01-11.*
(Continued)

*Primary Examiner* — Farid Homayounmehr
*Assistant Examiner* — Zhimei Zhu
(74) *Attorney, Agent, or Firm* — Van Pelt, Yi & James LLP

(57) ABSTRACT

Embodiments of the present application relate to a method, apparatus, and system for providing a security check. The method includes receiving a security verification request sent from a terminal, obtaining first verification element information based at least in part on the security verification request, generating a digital object unique identifier based at least in part on the first verification element information, sending the digital object unique identifier to the terminal, receiving second verification element information from the terminal, and in the event that the first verification element information and the second verification element information are consistent, sending security check pass information to the terminal.

14 Claims, 12 Drawing Sheets

Related U.S. Application Data continuation of application No. 14/717,545, filed on May 20, 2015, now Pat. No. 9,787,660.

(51) Int. Cl.
| | |
|---|---|
| *G06Q 20/32* | (2012.01) |
| *H04L 9/32* | (2006.01) |
| *G06Q 20/38* | (2012.01) |
| *H04W 12/08* | (2009.01) |
| *H04W 12/00* | (2009.01) |

(52) U.S. Cl.
CPC .......... *H04L 9/3226* (2013.01); *H04L 9/3297* (2013.01); *H04L 63/0876* (2013.01); *H04L 63/10* (2013.01); *H04L 63/12* (2013.01); *H04W 12/06* (2013.01); *H04W 12/08* (2013.01); *H04L 63/067* (2013.01); *H04L 2209/34* (2013.01); *H04W 12/00522* (2019.01)

(58) Field of Classification Search
CPC . H04L 2209/34; H04L 63/067; G06Q 20/388; G06Q 20/3276; H04W 12/08; H04W 12/06; H04W 12/00522
See application file for complete search history.

(56) References Cited

U.S. PATENT DOCUMENTS

| | | | | |
|---|---|---|---|---|
| 8,127,339 | B2 | 2/2012 | Ernst | |
| 8,256,664 | B1* | 9/2012 | Balfanz | G06F 21/43 235/375 |
| 8,407,463 | B2 | 3/2013 | Ghirardi | |
| 8,627,438 | B1* | 1/2014 | Bhimanaik | H04L 63/10 726/9 |
| 8,650,283 | B1* | 2/2014 | Chang | H04N 21/25875 709/224 |
| 9,319,419 | B2* | 4/2016 | Sprague | H04L 63/0876 |
| 9,501,773 | B2* | 11/2016 | Dai | G06Q 20/40 |
| 9,773,277 | B2* | 9/2017 | He | G06Q 40/02 |
| 9,787,660 | B2* | 10/2017 | Feng | G06Q 20/3276 |
| 2003/0023566 | A1 | 1/2003 | Fujisawa | |
| 2003/0110381 | A1* | 6/2003 | Aoshima | G06F 21/31 713/168 |
| 2004/0250068 | A1* | 12/2004 | Fujisawa | G06Q 20/32 713/168 |
| 2006/0036858 | A1* | 2/2006 | Miura | H04L 63/08 713/170 |
| 2006/0080545 | A1* | 4/2006 | Bagley | H04L 63/083 713/183 |
| 2006/0085846 | A1* | 4/2006 | Uno | G06F 21/10 726/6 |
| 2007/0005963 | A1* | 1/2007 | Eldar | G06F 21/6209 713/168 |
| 2007/0136573 | A1* | 6/2007 | Steinberg | G06F 21/32 713/155 |
| 2008/0172340 | A1 | 7/2008 | Karlsson | |
| 2008/0207220 | A1 | 8/2008 | Aaron | |
| 2008/0242264 | A1 | 10/2008 | Malik | |
| 2010/0070759 | A1* | 3/2010 | Leon Cobos | G06F 21/43 713/155 |
| 2010/0162353 | A1 | 6/2010 | Koo | |
| 2010/0176919 | A1* | 7/2010 | Myers | G07C 9/00571 340/5.73 |
| 2010/0250929 | A1* | 9/2010 | Schultz | H04L 63/083 713/168 |
| 2010/0262312 | A1 | 10/2010 | Kubota | |
| 2011/0271099 | A1* | 11/2011 | Preiss | H04L 63/0807 713/155 |
| 2012/0075059 | A1* | 3/2012 | Fyke | G06F 21/35 340/5.21 |
| 2012/0095822 | A1* | 4/2012 | Chiocchi | G06Q 30/0207 705/14.26 |
| 2012/0138679 | A1* | 6/2012 | Doyle | G06K 19/06037 235/380 |
| 2012/0266224 | A1 | 10/2012 | Gruschka | |
| 2012/0284195 | A1* | 11/2012 | McMillen | G06Q 20/3223 705/71 |
| 2013/0117078 | A1* | 5/2013 | Weik, III | E05F 15/70 705/13 |
| 2013/0185210 | A1* | 7/2013 | Dodson | H04L 63/08 705/44 |
| 2013/0212653 | A1* | 8/2013 | Hoghaug | G06F 21/34 726/5 |
| 2013/0219479 | A1* | 8/2013 | DeSoto | H04W 12/06 726/6 |
| 2013/0254858 | A1* | 9/2013 | Giardina | G06F 21/42 726/7 |
| 2013/0282589 | A1 | 10/2013 | Shoup | |
| 2014/0033286 | A1* | 1/2014 | Zhang | H04L 63/083 726/7 |
| 2014/0181929 | A1* | 6/2014 | Zheng | G06F 21/31 726/6 |
| 2014/0197232 | A1* | 7/2014 | Birkler | G06F 21/313 235/375 |
| 2014/0215583 | A1* | 7/2014 | Ding | H04W 12/06 726/5 |
| 2014/0282958 | A1* | 9/2014 | Salonen | H04L 63/0861 726/7 |
| 2015/0041530 | A1 | 2/2015 | Burkhart | |
| 2015/0089568 | A1* | 3/2015 | Sprague | H04L 63/0876 726/1 |
| 2015/0121506 | A1* | 4/2015 | Cavanaugh | G06F 21/62 726/16 |
| 2015/0149777 | A1 | 5/2015 | Kim | |
| 2015/0172283 | A1* | 6/2015 | Omnes | H04L 63/0853 726/9 |
| 2015/0186994 | A1* | 7/2015 | He | G06Q 40/02 705/44 |
| 2015/0242602 | A1 | 8/2015 | Skygebjerg | |
| 2016/0314462 | A1* | 10/2016 | Hong | G09C 5/00 |
| 2017/0372415 | A1* | 12/2017 | He | G06Q 40/02 |

OTHER PUBLICATIONS

Mukund Sarma, "Second Level Authentication Using QR Codes", 2013, International Journal of Computer and Internet Security.vol. 5, No. 2 (2013), pp. 43-50.*

Isaac Potoczny-Jones, "Quick authentication using mobile devices and QR Codes", Feb. 18, 2014, retrieved online from <http://galois.com/blog/2011/01/quick-authentication-using-mobile-devices-and-qr-codes/>, retrieved on May 24, 2017.

Kyeongwon Choi, Changbin Lee, Woongryul Jeon, Kwangwoo Lee and Dongho Won, "A mobile based anti-phishing authentication scheme using QR code," International Conference on Mobile IT Convergence, Gyeongsangbuk-do, 2011, pp. 1 09-113.

* cited by examiner

METHOD, APPARATUS, AND SYSTEM FOR PROVIDING A SECURITY CHECK

CROSS REFERENCE TO OTHER APPLICATIONS

This application is a continuation of co-pending U.S. patent application Ser. No. 15/667,262, entitled METHOD, APPARATUS, AND SYSTEM FOR PROVIDING A SECURITY CHECK filed Aug. 2, 2017 which is incorporated herein by reference for all purposes, which is a continuation of U.S. patent application Ser. No. 14/717,545, entitled METHOD, APPARATUS, AND SYSTEM FOR PROVIDING A SECURITY CHECK filed May 20, 2015, now U.S. Pat. No. 9,787,660, which is incorporated herein by reference for all purposes, which claims priority to People's Republic of China Patent Application No. 201410219868.0 entitled A METHOD, A DEVICE, A SERVER AND A TERMINAL FOR SECURITY CHECKS, filed May 22, 2014 which is incorporated herein by reference for all purposes.

FIELD OF THE INVENTION

The present application relates to a field of network communications security technology. In particular, the present application relates to a method, a device, a server, a system, and a terminal for verifying security.

BACKGROUND OF THE INVENTION

As a result of the development of smart terminals and Internet applications, users can access various Internet applications using various application clients installed on terminals. In connection with the process by which a user accesses the various Internet applications, users are generally required to authenticate identities, register as members, engage in network transactions, or the like. According to some related art, an application server sends a verification text message including a dynamic verification code to the terminal in the user's possession. The user is then generally required to enter the dynamic verification code included in the verification text message. In the event that the user enters the dynamic verification code, the user passes the application server's security check and is granted access to the Internet application.

However, the dynamic verification code carried in the verification text message is generally composed of simple numbers. For example, in the event that an Internet transaction is being conducted, an online banking server associated with the Internet transaction will send a verification text message consisting of a six-digit number to the user-registered terminal. If the user correctly enters the six-digit number included in the verification text message, the user is permitted to complete the online banking transaction. However, because verification text messages used in some related art only include simple written numerical information, malicious third parties can steal the verification text messages or the numerical information included in the verification text messages using Trojan Horse programs with relative ease. The malicious third parties can enter the written numerical information in secure verification interfaces and thereby complete security checks. Accordingly, numerical verification codes transmitted in existing security check methods are relatively unreliable, resulting in poor access security for Internet applications.

Therefore, there is a need for a method, device, server, system, and terminal for providing more effective security checks.

BRIEF DESCRIPTION OF THE DRAWINGS

Various embodiments of the invention are disclosed in the following detailed description and the accompanying drawings.

The drawings here have been incorporated in the description and constitute a part of the description. They depict embodiments that conform to the present application and are used together with the description to explain the principles of the present application.

DETAILED DESCRIPTION

Figure 1:
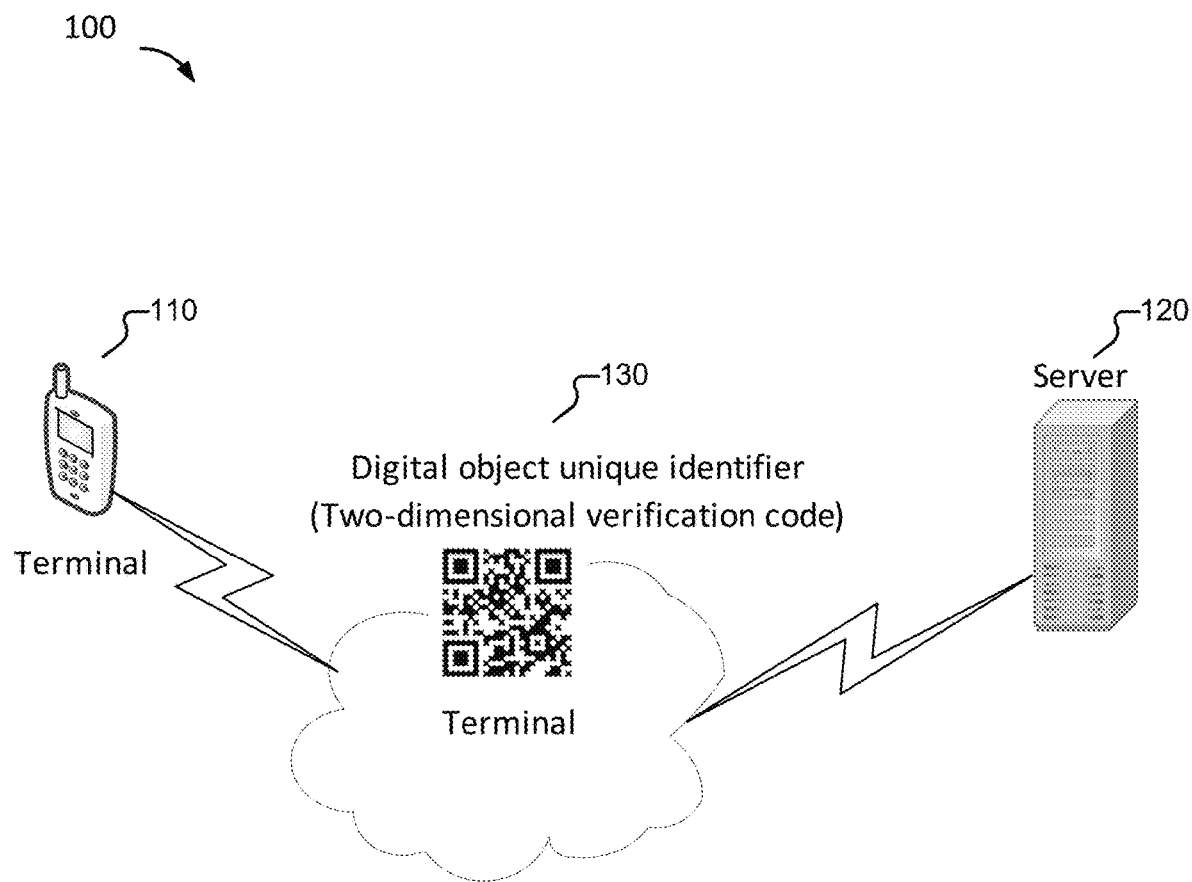
FIG. 1 is a diagram of an application context according to various embodiments of the present disclosure of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

Although the present application employs the terms "first," "second," "third," and so on to describe various information, this information shall not be limited by these terms. These terms merely serve to differentiate pieces of information of the same category. For example, so long as they remain within the scope of the present application, a first piece of information could be called a second piece of information. Similarly, a second piece of information could be called a first piece of information. It depends on the context, for example, the term "if" that is used herein may be interpreted as "when" or "upon being confirmed."

A terminal generally refers to a device used (e.g., by a user) within a network system and used to communicate with one or more servers. According to various embodiments of the present disclosure, a terminal may include communication functionality. For example, a terminal may be a smart phone, a tablet computer, a mobile phone, a video phone, an e-book reader, a desktop Personal Computer (PC), a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), or the like.

According to some embodiments of the present disclosure, a terminal includes a smart home appliance with communication functionality. A smart home appliance can be, for example, a television, a Digital Video Disk (DVD) player, an audio device, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, or the like.

According to various embodiments of the present disclosure, a terminal can be any combination of the foregoing terminals. In addition, it will be apparent to one having ordinary skill in the art that a terminal according to various embodiments of the present disclosure is not limited to the foregoing terminal.

Various embodiments of the present disclosure include a method, a device, a server, a system, and a terminal for providing security. For example, various embodiments of the present disclosure include a method, a device, a server, a system, and a terminal for providing security checks. The security checks can be provided in connection with access events (e.g., a user attempting to access a network service or application such as a web-based service).

FIG. 1 is a diagram of an application context according to various embodiments of the present disclosure of the present application.

Referring to FIG. 1, a context (also referred to as an environment) 100 for using a security verification is provided. In some embodiments, processes 200-400 of FIGS. 2-4 can be implemented in the environment 100.

As illustrated, the context 100 includes a terminal 110 and a server 120. A user can access various Internet applications through the various application clients installed on the terminal 110. For example, the terminal 110 can access a website or a service hosted by the server 120 using the Internet. During the access process, the user can be required to authenticate the user's identity, register as a member, engage in an online transaction, or the like. In order to ensure the security of the access process, the server 120 can perform a security check on the identity of the user.

According to some related art, in the event that a user attempts to access an Internet application, a security check can be performed by a user entering written numeric information into a security verification interface. The user can obtain the numeric information from a text message that is transmitted to the user's terminal over a mobile network.

According to various embodiments of the present application, a security check includes verification processes between the terminal 110 and server 120 that are based on the Internet. The verification process uses a digital object unique identifier (DOUI)-based technique (130). As will be described in greater detail below, the DOUI-based verification process associated with a security process enhances verification reliability and security.

Figure 2:
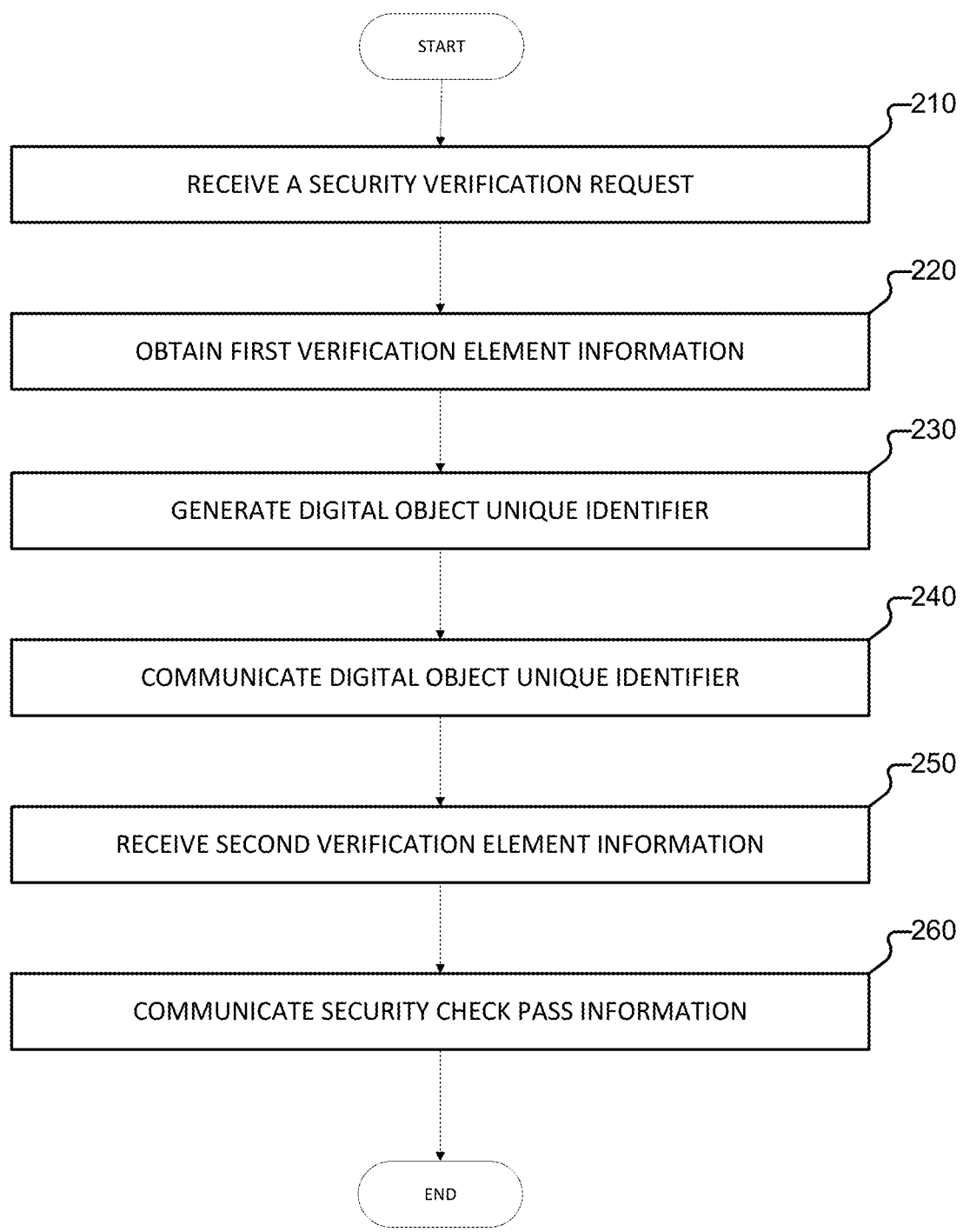
FIG. 2 is a flowchart of a security check method according to various embodiments of the present disclosure of the present application.

FIG. 2 is a flowchart of a security check method according to various embodiments of the present disclosure of the present application.

Referring to FIG. 2, a method 200 for performing a security check is provided. In some embodiments, process 200 can be implemented by device 500 of FIG. 5, device 600 of FIG. 6, or device 900 of FIG. 9.

At 210, a security verification request is received. In some embodiments, a server receives the security verification request. The security verification request can be sent from a terminal. The terminal can send the security verification request in connection with an access event, an online transaction, or the like. A user can select to have a security check performed in connection with the access event, the online transaction, or the like. For example, in the event that a terminal is used to perform an online transaction using a user interface (e.g., a webpage for a website displayed by a browser installed on the terminal), the terminal can provide an option to perform the security verification request (e.g., via a dialog box, a selection box, etc.). The user can select to perform a security verification request option on the interface, and in connection with the selection to perform a security verification request option, a security verification request is communicated.

According to some embodiments, a security check can be provided in a client interface on a terminal. For example, in the event that a user accesses an Internet application (e.g., an application running on a server) through a client on a terminal, the user can enter a client interface of the Internet application (e.g., load a specific page comprising the client interface via a browser, or invoke the client interface using a client-side application) and undergo a security check in the client interface. For example, a security check can be provided in connection with (e.g., during) an online transaction. In this case, the user can select (e.g., click) the security verification request option on the client interface. In the event that the security verification request option is selected, the server receives the security verification request sent by the terminal.

In some embodiments, an identifier is communicated in connection with the security verification request. For example, the identifier can correspond to a username, a terminal identifier, the like, or any combination thereof. The identifier can be included in the security verification request. For example, the username of the user using, or otherwise logged into, the terminal, can be communicated in the security verification request. In some embodiments, the terminal identifier can be a Media Access Control (MAC) address, a phone number (e.g., a phone number read from SIM card or UIM card of a mobile phone), a Subscriber Identity Module (SIM) card number, an Internet Protocol (IP) address, International Mobile Station Equipment Identity (IMEI), Mobile Equipment Identifier (MEID), a token, or another identifier that identifies the terminal.

At 220, first verification element information is obtained. In some embodiments, the server obtains the first verification element information. For example, the server can obtain first verification element information according to the security verification request.

In some embodiments, the server can store mappings between usernames and terminal information. For example, the server can store an association between a username and the terminal identifier of the terminal used by the user. In the event that the security verification request sent by the terminal is received, saved mapping between the usernames and terminal information can be searched with the terminal owner's username (which is included in the security verification request) to obtain the terminal identifier of the terminal corresponding to the terminal user. The terminal identifier can be referred to as a first terminal identifier.

In some embodiments, the server can generate a first security verification code and a first timestamp in connection with the present security check based at least in part on the security verification request. The first timestamp can be used to indicate the time limit of the present security check. The first security verification code can be text, numbers, captions, pictures, links, the like, or any combination thereof. The first terminal identifier, the first security verification code, and the first timestamp can be collectively referred to as a first verification element information. The first verification code can be randomly generated. For example, the first verification code can be generated using a randomized calculation function such as RandomStringUtils. randomAlphanumeric(int length).

At 230, a digital object unique identifier is generated. In some embodiments, a server generates the digital object unique identifier. The digital object unique identifier can be generated based at least in part on the first verification element information. For example, the digital object unique identifier can be generated using the first terminal identifier, the first security verification code, and the first timestamp.

In some embodiments, the digital object unique identifier is a tool used to identify numerical information. The digital object unique identifier can include a two-dimensional code, a barcode, a Quick Response (QR) code, the like, or any combination thereof. The digital object unique identifier can be configured according to an application environment in which the digital object unique identifier is to be used. For example, the digital object unique identifier can be configured to include a two-dimensional code, a barcode, a QR code, or the like according to the application environment. In some embodiments, the server can use digital object unique identifiers to carry verification information in order to increase a reliability of a security check. In the event that the server has obtained first verification element information, the server can generate a first combination character string. The server can use the first terminal identifier, the first security verification code, and the first timestamp included therein to generate the combination character string. For example, the server can combine the first terminal identifier, the first security verification code, and the first included timestamp therein to generate a first combination character string. In the event that the server has generated the combination character string, the server can generate a digital object unique identifier using the first combination character string by executing a generation function that receives the first combination character string as an input. Various known methods for generating digital object unique identifiers using character strings (e.g., a createQRForString function provided with the iOS library) can be used to generate the digital unique identifier using the first combination character string.

At 240, the digital object unique identifier is communicated. In some embodiments, the server communicates the digital object unique identifier. For example, the server can send the digital object unique identifier to the terminal. The image corresponding to the digital object identifier (e.g., a 2D barcode, a QR code, or the like) can be included in a message that the server sends to the terminal.

In some embodiments, the entire verification process between the terminal and the server is Internet-based. Accordingly, the server can send the digital object unique identifier via online transmission to the terminal. The digital object unique identifier can be transmitted to the terminal as an attachment to an email, an attachment to an instant message, in connection with a webpage, in connection with an HTTP session, or the like.

At 250, a second verification element information is received. In some embodiments, the server receives the second verification element information. For example, the server can receive the second verification element information from the terminal. The terminal includes code that is configured to receive the digital object unique identifier, and in response to receiving the digital object unique identifier, communicates the second verification element information to the server. The second verification element information can include, or otherwise correspond to, verification element information obtained by the terminal through the digital object unique identifier. For example, the terminal can extract the first verification element information from the digital object unique identifier and generate the second verification element information using the first verification element information extracted from the digital object unique identifier.

In some embodiments, the terminal scans, or otherwise processes (e.g., analyzes), the digital object unique identifier received from the server. When the terminal scans, or otherwise processes, the received digital object unique identifier, the terminal obtains a second combination character string. The terminal can decompose, or otherwise process, the second combination character string. The terminal can obtain a second terminal identifier, a second security verification code, and a second timestamp by decomposing the second combination character string. The second terminal identifier, the second security verification code, and the second timestamp belong to, or otherwise collectively correspond to, the second verification element information. For example, the second verification element information can include the second terminal identifier, the second security verification code, and the second timestamp. In some embodiments, the terminal can determine whether the second terminal identifier obtained from the digital object unique identifier received from the server is the same as the terminal identifier of the terminal. In the event that the terminal determines that the second terminal identifier obtained from the digital object unique identifier received from the server is the same as the terminal identifier of the terminal, the terminal can send the second verification element information to the server.

The terminal can scan the digital object unique identifier by processing an image of the digital object unique identifier that is captured by a camera connected to the terminal. In some embodiments, the scanning of the digital object unique identifier includes the capturing of the image of the digital object unique identifier with the camera connected to the terminal.

In some embodiments, the terminal has an application installed thereon which invokes a camera of the terminal in order to capture the digital object unique identifier (e.g., 2D code or QR code) displayed by the first terminal. The terminal includes image processing code that uses image recognition to extract geometric images from the image, and decode the image accordingly.

In some embodiments, the terminal obtains the digital object unique identifier from an email message, a Short Message Service (SMS) message, a Multimedia Message Service (MMS) message, or the like. The terminal can extract the digital object unique identifier (e.g., a 2D code or QR code) or image thereof from an email message and translate the digital object unique identifier using (e.g., by executing) image processing code. The image processing code can reverse translate the digital object unique identifier in order to obtain the information included (e.g., embedded) therein. The pieces of information (e.g., security verification code, mobile phone number, timestamp, or the like) included in the digital object unique identifier can be separated by a predefined character (e.g., a hyphen).

At 260, security check pass information is communicated. In some embodiments, the server communicates the security check pass information to the terminal. The server can determine whether the second verification element information is consistent with the first verification element information. For example, the server can determine whether the second verification element information matches the first verification element information. In the event that the server confirms that the first verification element information and the second verification element information are consistent (e.g., the first verification code is compared with the second verification code and the first timestamp and the second timestamp are compared with a current time according to the server), the server can send security check pass information back to the terminal. The security check pass information can indicate that the terminal has passed the security check. In the event that the server determines that the first verification element information and the second verification element information are not consistent (e.g., do not match), the server can send an indication that the security check failed to the terminal, deny the terminal access to a domain (e.g., the server), or deny, or otherwise prevent, a transaction associated with the security check.

In some embodiments, the server stores the first terminal identifier, the first security verification code, and the first timestamp. For example, in the event that the server obtains the first verification element information, the server can store the relationships (e.g., associations) between the first terminal identifier, the first security verification code, and the first timestamp. The relationships can be stored in a table or database. In response to receiving the second verification element information, the server can search the stored relationships of terminal identifiers, security verification codes, and timestamps using the second terminal identifier (e.g., the terminal identifier included in the second verification element information), in order to obtain the security verification code and timestamp corresponding to the second terminal identifier. In the event that the server determines (e.g., confirms) that the second security verification code and the obtained security verification code are the same, that the second timestamp and the obtained timestamp are the same, and that the second timestamp is within the time limit (e.g., 60 seconds) of the present security check (e.g., which can be determined to correspond to a current time of the server), the server sends the security check pass information to the terminal.

The digital object unique identifier can be used to transmit verification information during a security check. Richer and more reliable confirmation information can be transmitted in connection with a digital object unique identifier than in a security check according to some related art that implements a text message that only includes numerals. Compared with numerical values, the confirmation information transmitted in connection with the digital object unique identifier is relatively difficult to steal and use. Accordingly, the access security of Internet applications can be enhanced by using digital object unique identifiers in the communication of the confirmation information rather than text messages in connection with the communication of written numerals. According to various embodiments, the digital object unique identifier is transmitted via Internet traffic and thus avoids the communication charges that arise when verification codes are transmitted via text messages. As a result, in various embodiments, mobile communication resources required to perform a security check are reduced. According to some embodiments, in response to the terminal recognizing the digital object unique identifier or information included in the digital object unique identifier, the terminal can automatically send back recognition information to the server. Accordingly, the security check process according to various embodiments does not require manual entry by the user and avoids the possibility of confirmation information from manual fraud.

Figure 3:
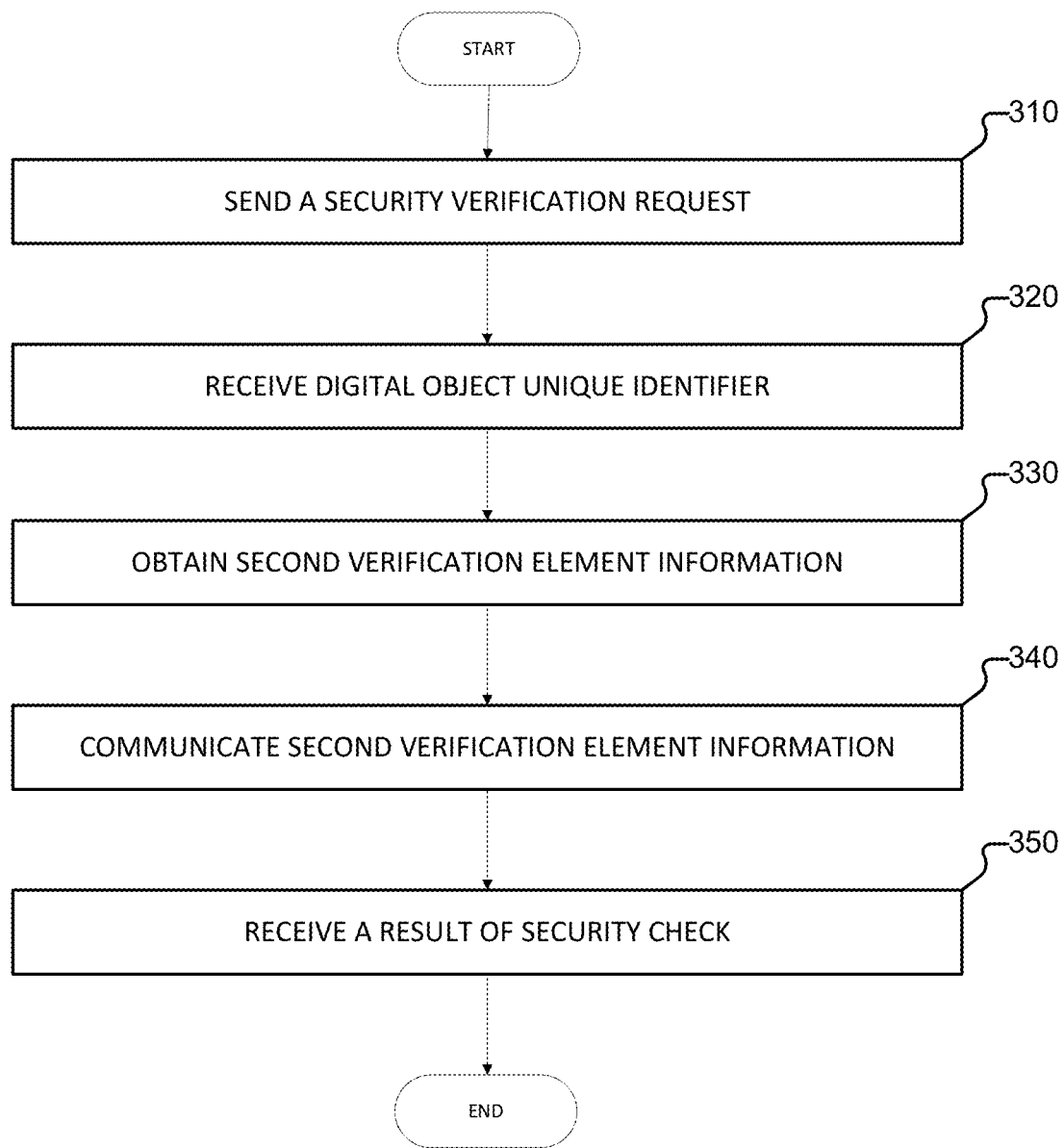
FIG. 3 is a flowchart of a security check method according to various embodiments of the present disclosure of the present application.

FIG. 3 is a flowchart of a security check method according to various embodiments of the present disclosure of the present application.

Referring to FIG. 3, a method 300 for performing a security check is provided. In some embodiments, process 300 can be implemented by device 700 of FIG. 7, device 800 of FIG. 8, or terminal 1000 of FIG. 10.

At 310, a security verification request is communicated. In some embodiments, a terminal can send the security verification request to a server. The terminal can send the security verification request in connection with an access event, an online transaction, or the like. A user can select to have a security check performed in connection with the access event, the online transaction, or the like. For example, in the event that a terminal is used to perform an online transaction using a user interface (e.g., a webpage for a website displayed by a browser installed on the terminal), the terminal can provide an option to perform the security verification request (e.g., via a dialog box, a selection box, etc.). The user can select to perform a security verification request option on the interface, and in connection with the selection to perform a security verification request option, a security verification request is communicated.

According to some embodiments, a security check can be provided in a client interface on a terminal. For example, in the event that a user accesses an Internet application (e.g., an application running on a server) through a client on a terminal, the user can enter a client interface of the Internet application (e.g., load a specific page comprising the client interface via a browser, or invoke the client interface using a client-side application) and undergo a security check in the client interface. For example, a security check can be provided in connection with an online transaction. In the event that the user selects (e.g., clicks) a request option on the client interface, a security verification request can be sent through the terminal to the server.

In some embodiments, an identifier is communicated in connection with the security verification request. For example, the identifier can correspond to a username, a terminal identifier, the like, or any combination thereof. The identifier can be included in the security verification request. For example, the username of the user using, or otherwise logged into, the terminal, is communicated in the security verification request.

At 320, a digital object unique identifier is received. In some embodiments, the terminal receives the digital object unique identifier. The terminal can receive the digital object unique identifier from the server. For example, the digital object unique identifier can be sent back by the server in response to the server receiving (and processing) the security verification request. The digital object unique identifier is an identifier generated according to first verification element information after the server has obtained the first verification element information in accordance with the security verification request. For example, the digital object unique identifier can be generated using the first terminal identifier, the first security verification code, and the first timestamp. The first security verification code can be determined according to a terminal identifier included (e.g., the first terminal identifier) in, or communicated in connection with, the security verification request. The first timestamp can be used to indicate the time limit of the present security check.

At 330, second verification element information is obtained. In some embodiments, the terminal obtains the second verification element information. The terminal can obtain the second verification element information using the digital object unique identifier. The terminal can communicate the second verification element information to the server in response to the terminal receiving the digital object unique identifier. The second verification element information can include, or otherwise correspond to, verification element information obtained by the terminal through the digital object unique identifier. For example, the terminal can extract verification element information from the digital object unique identifier and generate the second verification element information using the verification element information extracted from the digital object unique identifier.

The digital object unique identifier can be generated by the server. For example, the digital object unique identifier can be generated based at least in part on a first combination character string. The first combination character string can be generated using a first terminal identifier, a first security verification code, and a first timestamp. For example, the server can generate the first combination character string by combining a first terminal identifier, a first security verification code, and a first timestamp. The first terminal identifier, the first security verification code, and the first timestamp can belong to, or be included in, a first verification element information. The first terminal identifier can correspond to the terminal's terminal identifier. The terminal's terminal identifier can be determined based at least in part on information included in the security verification request. For example, the terminal's terminal identifier can be determined according to the terminal username carried in the security verification request. The first security check can correspond to the security verification code generated by the server in connection with the present security check and the first timestamp can correspond to a timestamp generated by the server in connection with the present security check.

In some embodiments, the terminal scans, or otherwise processes (e.g., analyzes), the digital object unique identifier received from the server. In the event that the terminal scans, or otherwise processes, the received digital object unique identifier, the terminal can obtain a second combination character string. For example, the terminal can obtain the second combination character string by scanning the digital object unique identifier. The terminal can decompose, or otherwise process, the second combination character string. The terminal can obtain a second terminal identifier, a second security verification code, and a second timestamp by decomposing the second combination character string. The second terminal identifier, the second security verification code, and the second timestamp belong to, or otherwise collectively correspond to, the second verification element information. For example, the second verification element information can include the second terminal identifier, the second security verification code, and the second timestamp.

At 340, the second verification element information is communicated. In some embodiments, the terminal communicates the second verification element information. For example, the terminal can send the second verification element information to the server.

In some embodiments, the terminal can determine whether the second terminal identifier obtained from the digital object unique identifier received from the server is the same as the terminal identifier of the terminal. In the event that the terminal determines that the second terminal identifier obtained from the digital object unique identifier received from the server is the same as the terminal identifier of the terminal, the terminal can send the second verification element information to the server.

At 350, a result of a security check is received. In some embodiments, the terminal receives the result of the security check from the server. For example, in the event that a security check is successful, the terminal can receive security check pass information from the server.

The server can determine whether the second verification element information is consistent with the first verification element information. For example, the server can determine whether the second verification element information matches the first verification element information. In the event that the server confirms that the first verification element information and the second verification element information are consistent (e.g., match), the server can send security check pass information back to the terminal and the terminal can receive the security check pass information. The security check pass information can indicate that the terminal has passed the security check (e.g., that the security check is successful). In the event that the server determines that the first verification element information and the second verification element information are not consistent (e.g., do not match), the server can send an indication that the security check failed to the terminal, deny the terminal access to a domain (e.g., the server), or deny, or otherwise prevent, a transaction associated with the security check.

In some embodiments, the server can store the first terminal identifier, the first security verification code, and the first timestamp. For example, in the event that the server obtains the first verification element information, the server can store the relationships between the first terminal identifier, the first security verification code, and the first timestamp. The relationships can be stored in a table or database. In response to receiving the second verification element information, the server can search the stored relationships of terminal identifiers, security verification codes, and timestamps in order to obtain the security verification code and timestamp corresponding to the second terminal identifier (e.g., a terminal identifier included in the second verification element information). In the event that the server determines (e.g., confirms) that the second security verification code and the obtained security verification code are the same, that the second timestamp and the obtained timestamp are the same, and that the second timestamp is within the time limit of the present security check, the server can send the security check pass information to the terminal.

The digital object unique identifier can be used to transmit verification information during a security check. Richer and more reliable confirmation information can be transmitted in connection with a digital object unique identifier than in a security check according to some related art that implements a text message including written numerals. In some embodiments, the confirmation information transmitted in connection with the digital object unique identifier is relatively difficult to steal and use. Accordingly, the access security of Internet applications can be enhanced by using digital object unique identifiers in the communication of the confirmation information rather than text messages in connection with the communication of written numerals. According to various embodiments, the digital object unique identifier is transmitted via Internet traffic and thus avoids the communication charges that arise when verification codes are transmitted via text messages. As a result, in various embodiments, there is a reduction in mobile communication resources required to perform a security check. According to some embodiments, in response to the terminal recognizing the digital object unique identifier or information included in the digital object unique identifier, the terminal can automatically send back recognition information to the server. Accordingly, the security check process according to various embodiments does not require manual entry by the user and avoids the possibility of confirmation information from manual fraud.

According to various embodiments, the security check process can be performed in connection with exchanges between a terminal and a server. The digital object unique identifier used in connection with a security check process can be a two-dimensional code.

Figure 4:
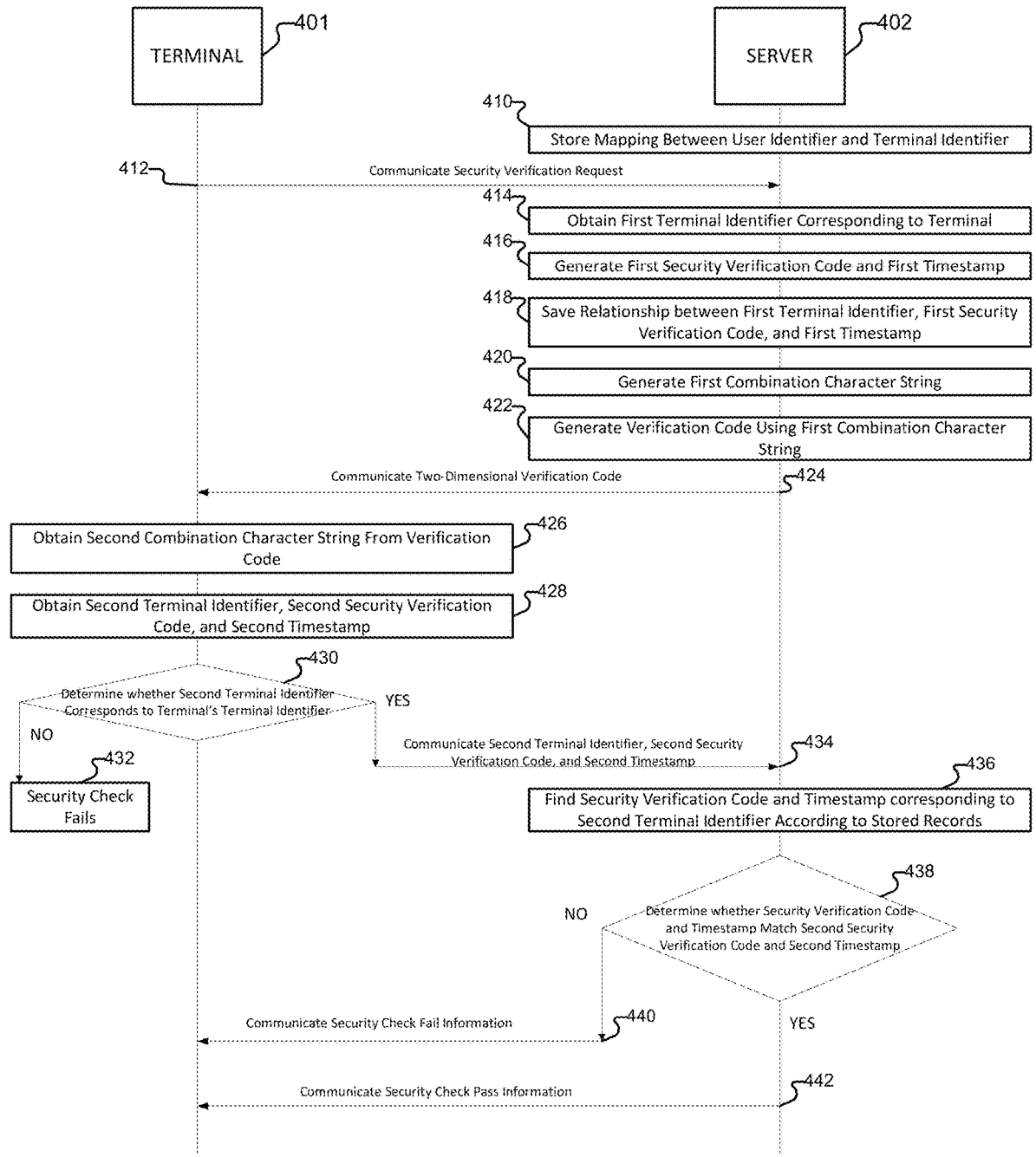
FIG. 4 is a flowchart of a security check method according to various embodiments of the present disclosure of the present application.

FIG. 4 is a flowchart of a security check method according to various embodiments of the present disclosure of the present application.

Referring to FIG. 4, a method 400 for performing a security check is provided. In some embodiments, at least part of process 400 can be implemented by device 500, 600, 700, 800, 900, and 1000 of FIGS. 5-10.

At 410, the server 402 stores mappings between user identifiers and terminal identifiers. For example, the server 402 stores correspondences between usernames and terminal identifiers. The server 402 can store the mapping between the user identifier and the terminal identifier in a table, a database, the like, or any combination thereof.

In some embodiments, the terminal that undergoes the security check is a mobile device (e.g., a cell phone) with mobile communication functions. Accordingly, the terminal identifier can be a cell phone number, the SIM card number, or the like. The server can pre-save correspondences between the usernames of users and the users' respective terminal identifiers (e.g., cell phone numbers) so that security checks can be implemented in specific security check scenarios. For example, in the event that a user is registered with a certain Internet application, a user is generally required to enter the user's credentials (e.g., username, password, cell phone number, and other information). In the event that the application server receives the user's credentials, the application server can save the correspondences of such information. In another example, in the event that a user begins Internet banking, the transaction server can save the correspondences of such information and can synchronize the correspondences for the information with the payment server of a payment website.

At 412, the terminal 401 sends a security verification request to the server 402.

According to some embodiments, a security check can be provided in a client interface on a terminal. For example, in the event that a user accesses an Internet application through a client on the user's terminal 401, the user can enter (e.g., load) a client interface of the Internet application and undergo a security check in the client interface. For example, a security check can be provided in connection with an online transaction. In this case, after the user selects (e.g., clicks) a request option on the client interface, a security verification request can be sent through the terminal 401 to the server 402.

At 414, the server 402 obtains a first terminal identifier corresponding to the terminal 401. For example, the server 402 can use the terminal's username carried in, or communicated in connection with, the security verification request as a basis for searching for the correspondence and obtains a first terminal identifier associated with the terminal 401 corresponding to the username of terminal 401.

The server can obtain the terminal's username from the security verification request and use the terminal's username in a search for the correspondences (e.g., the mapping saved at 410) to obtain the terminal identifier for the terminal 401 corresponding to this username. The terminal identifier for the terminal 401 corresponds to the first terminal identifier.

At 416, the server 402 generates the first security verification code and the first timestamp. In the event that the server 402 receives the security verification request, the server generates the first security verification code and the first timestamp. For example, the first security verification code and the first timestamp are associated with the security verification request.

The server can automatically generate a first security verification code and a first timestamp in connection with the present security check. The first timestamp can be used to indicate the time limit of the present security check. The first security verification code may specifically be text, numerals, captions, pictures, links, the like, or any combination thereof. The first terminal identifier, the first security verification code, and the first timestamp can be collectively referred to as a first verification element information.

At 418, the server 402 saves a relationship between the first terminal identifier, the first security verification code, and the first timestamp. The server saves the relationships between the first terminal identifier, the first security verification code, and the first timestamp.

In some embodiments, a relational table is configured in the server to save the relationships between the terminal identifier, the security verification code, and the timestamp of each security check.

At 420, a first combination character string is generated. In some embodiments, the server 402 generates the first combination character string. The first combination character string can be generated based at least in part on the first terminal identifier, the first security verification code, and the first timestamp. For example, the first combination character string can be generated by combining the first terminal identifier, the first security verification code, and the first timestamp.

According to various embodiments, different modes of combining can be used to combine the first terminal identifier, the first security verification code, and the first timestamp. For example, assuming that the first terminal identifier corresponds to the terminal user cell phone number "13000001234," the first security verification code is "Aj89," and the first timestamp is "5-12-2014 14:06 189," the first terminal identifier, the first security verification code, and the first timestamp can be combined using double slashes or other separator characters to form a first combination character string, such as: 13000001234//5-12-2014 14:06 189//Aj89.

At 422, a verification code is generated. In some embodiments, the server 402 generates the verification code. The verification code can be generated based at least in part on the first combination character string. As an example, the verification code can be configured to include a two-dimensional code, a barcode, a QR code, or the like. In some embodiments, the verification code can correspond to a digital object unique identifier. For example, the server 402 can generate a two-dimensional verification code using the first combination character string. The first combination character string can be processed and used to generate the two-dimensional verification code.

In the event that a two-dimensional verification code is generated, the first combination character string can be encrypted to produce an encrypted character string. The encrypted character string can be used to generate the two-dimensional verification code. Because the characters in an encrypted character string are typically longer, the encrypted character string can be converted to a base 64 string. The base 64 string can be encoded to produce a two-dimensional verification code. According to various embodiments, the encrypted character string can be converted to a base n string, where n is a positive integer. The first combination character string can be encrypted according to various encryption methods. For example, the first combination character string can be generated using a known encryption technique, such as a hash encryption method, a symmetric encryption method, an asymmetric method, MD5, or the like. In some embodiments, any string encryption can be used. For example, the Data Encryption Standard (DES), which uses a key of 64 bits to encrypt a 64 bit string, to generate an encrypted 64 bit value, can be used.

In some embodiments, the two-dimensional verification code is a graphic figure comprising alternating black and white distributed across the plane of a geometric figure according to a specific pattern. The terminal can read (e.g., scan) the two-dimensional code information with two-dimensional verification code scanning software. For example, the terminal can capture an image of the two-dimensional verification code and process the captured image to extract information embedded in, or otherwise included in, the two-dimensional code. As an example, the terminal can capture the image of the two-dimensional verification code by invoking an image capture code that uses a camera of the terminal to capture an image of the two-dimensional verification code. As another example, the terminal can capture the image of the two-dimensional verification code by extracting the image of the two-dimensional verification code, or the two-dimensional verification code itself, from a message such as an email, an SMS message, an MMS message, an instant message, or the like. The two-dimensional verification code can be a QR code encoded and generated according to QR rules. The QR code can be quickly read and can save a greater volume of information, including text, pictures, and other different types of data for encoding. In some embodiments, the QR code is square-shaped and has only two colors: black and white. The QR code can include a smaller square figure printed in three of the four corners. These three square figures enable the user to scan the QR code from any angle. For example, the smaller square figure included in the three corners allows for a relative position of the QR code to be determined such that the QR code can be processed according to a defined orientation.

In some embodiments, in the event that the first combination character string is encrypted using a symmetrical encryption algorithm, the same encryption keys will be saved separately on the server 402 and on the terminal 401 (e.g., in a client program installed on the terminal 401). In the event that the first combination character string is encrypted using an asymmetrical encryption algorithm, the encryption key can be saved on the server 402, and the decryption key can be saved on the terminal 401 (e.g., in a client program installed on the terminal 401). In some embodiments, regardless of the type of encryption algorithm used to encrypt the first combination character string, the server 402 encrypts the first combination character string using a saved encryption key.

At 424, the server 402 sends the two-dimensional verification code (e.g., the verification code) to the terminal 401. The server 402 can send the two-dimensional verification code to the terminal 401 via the Internet.

In some embodiments, the entire verification process between the terminal and the server 402 is Internet-based. Therefore, the server 402 can send the two-dimensional verification code via online transmission to the terminal 401.

At 426, a second combination character string is obtained. In some embodiments, the terminal 401 obtains the second combination character string. The terminal 401 can obtain the second combination character string using (e.g., from) the verification code. For example, the terminal 401 obtains a second combination character string by scanning (and processing) the two-dimensional verification code. In some embodiments, information used to generate the second combination character string can be extracted from the two-dimensional verification code.

In the event that the terminal 401 receives the two-dimensional verification code, the two-dimensional verification code can be scanned with two-dimensional code scanning software to obtain a second combination character string. Corresponding to the process whereby the server 402 generates a two-dimensional code at 422, the terminal 401 can, in the two-dimensional code scanning process, decode the two-dimensional verification code according to a QR decoding rule to generate a base 64 character string. The base 64 character string can be converted to an encrypted character string, and the encrypted character string can be decrypted to obtain a second combination character string. In the event that the terminal 401 carries out decryption, the terminal 401 uses the decryption key corresponding to the encryption key saved by the server 402 to decrypt the encrypted character string.

At 428, a second terminal identifier, a second security verification code, and a second timestamp are acquired. In some embodiments, the terminal 401 obtains the second terminal identifier, the second security verification code, and the second timestamp using (e.g., from) the second combination character string. For example, in some embodiments, the terminal 401 can decompose the second combination character string to obtain the second terminal identifier, the second security verification code, and the second timestamp.

In some embodiments, the terminal 401 obtains the second terminal identifier, the second security verification code, and the second timestamp by using the reverse rule corresponding to the combining rule applied when the first combination character string was generated (e.g., by the server 402) in order to decompose the second combination character string. The result of decomposing the second combination character string can be the second terminal identifier, the second security verification code, and the second timestamp.

At 430, a determination is made as to whether the second terminal identifier corresponds to the terminal identifier of the terminal 401. In some embodiments, the terminal 401 compares the second terminal identifier with the terminal identifier of the terminal 401 (e.g., the first terminal identifier) to determine whether or not the second terminal identifier and the terminal identifier of the terminal 401 are consistent (e.g., in agreement).

In some embodiments, a first re-verification of the security check can be completed on the terminal 401. For example, the terminal 401 can compare the second terminal identifier (which the terminal 401 obtained through decomposition of the second combination character string) with its own first terminal identifier. If the second terminal identifier and the first terminal identifier are the same, then the matching of the second terminal identifier and the first terminal identifier can be deemed to indicate that the terminal 401 is the designated terminal of the user that is undergoing the security check. If the second terminal identifier and the first terminal identifier are not the same, then the inconsistency between the second terminal identifier and the first terminal identifier can be deemed to indicate that the terminal 401 is not the designated terminal of the user. For example, the owner of the terminal 401 may not be the user who wishes to undergo a security check. The detection effectiveness of security checks is thereby increased.

In some embodiments, in the event that the terminal is a multi-card multi-mode cell phone, the terminal 401 may encompass every cell phone number of the terminal 401 when comparing the cell phone number obtained through decomposition with the cell phone numbers of the terminal 401. If any cell phone of the terminal 401 is the same as a cell phone number obtained through decomposition, then that matching terminal 401 can be confirmed as the designated cell phone of the user.

In the event that the second terminal identifier is not consistent with (e.g., does not match) the terminal identifier of the terminal 401, then at 432, the security check fails. The terminal 401 can provide an indication to the user that the security check fails. For example, the terminal 401 can provide the indication in a popup dialog box, by a vibration, by a sound, by a change in the brightness of the screen, by an indicator light, the like, or any combination thereof. In the event that the second terminal identifier is not consistent with (e.g., does not match) the terminal identifier of the terminal 401, the security check process can end.

In the event that the second terminal identifier is consistent with (e.g., does match) the terminal identifier of the terminal 401, then at 434, the second terminal identifier, the second security verification code, and the second timestamp can be communicated. In some embodiments, the terminal 401 sends the second terminal identifier, the second security verification code, and the second timestamp to the server 402.

In the event that a terminal 401 compares a second terminal identifier with the terminal identifier of the terminal 401 and determines that the second terminal identifier is the same as the terminal identifier of the terminal 401 (e.g., the first terminal identifier), the terminal 401 can send the second terminal identifier, the second security verification code, and the second timestamp to the server 402 so that the server 402 can further verify the authenticity of the security check Internet operation and effectively carry out further verification. For example, the terminal 401 can establish a communication channel with a communication interface of a server 402 (e.g., a Hypertext Transfer Protocol (HTTP) connection or a Hypertext Transfer Protocol over Secure Socket Layer (HTTPS) connection), and transmit the second terminal identifier, the second security verification code, and the second timestamp. For example, the terminal 401 can transmit the second terminal identifier, the second security verification code, and the second timestamp as though the second terminal identifier, the second security verification code, and the second timestamp were three parameters of the interface to the server 402. Thus, no manual operation is necessary to transmit the second terminal identifier, the second security verification code, and the second timestamp to the server 402. In embodiments, the security check process requires no manual operation from a user of the terminal 401 in order to complete a security check.

At 436, the server 402 searches the relationships for a relationship corresponding to the second terminal identifier. For example, the server 402 searches records of the mappings between a terminal identifier, a security verification code, and a timestamp (e.g., records of the first terminal identifier, the first security verification code, and the first timestamp). In the event that the server 402 finds a record corresponding to the second terminal identifier, the server 402 obtains the corresponding verification code (e.g., the first verification code) and corresponding timestamp (e.g., the first timestamp) corresponding to the second terminal identifier.

The server can, by taking the received second terminal identifier as an index, search the relationships saved in step 418 and obtain the security verification code and timestamp corresponding to the second terminal identifier.

At 438, the server determines whether the obtained security verification code and the obtained timestamp (e.g., the security verification code and timestamp corresponding to the record associated with the second terminal identifier) match the second security verification code (e.g., the second verification code received at 434) and the second timestamp (e.g., the second timestamp received at 434). In some embodiments, the server determines whether the second security verification code and the second timestamp are the same as the security verification code and timestamp obtained according to the second terminal identifier and whether the second timestamp is within the time limit of the present security check.

At 438, if the server 402 determines that the second security verification code (e.g., corresponding to the first security verification code stored at 418) and the security verification code obtained at 434 are the same, that the second timestamp (e.g., corresponding to the first timestamp stored at 418) and the timestamp obtained at 434 are the same, and that the current time is not outside the time range defined by the second timestamp, then the server 402 can confirm that the terminal has passed the security check.

In the event that the server 402 determines that the obtained security verification code and the obtained timestamp (e.g., the security verification code and timestamp corresponding to the record associated with the second terminal identifier) do not match the second security verification code (e.g., the second verification code received at 434) and the second timestamp (e.g., the second timestamp received at 434), the security check fails. In the event that the security check fails, at 440, the server 402 can send security check fail information to the terminal 401. In the event that the terminal 401 receives the security check fail information from the server 402, the terminal 401 can provide an indication to the user that the security check fails. For example, the terminal 401 can provide the indication in a popup dialog box, by a vibration, by a sound, by a change in the brightness of the screen, by an indicator light, the like, or any combination thereof. In the event that the security check fails, the security check process can end.

In some embodiments, the security check fails in the event that the server determines that the second security verification code and the second timestamp are the same as the security verification code and timestamp obtained according to the second terminal identifier but the second timestamp is not within the time limit of the present security check. For example, the security check can time out (e.g., expire) if the second security verification code and the second timestamp are not determined to be the same as the security verification code and timestamp obtained according to the second terminal identifier within a threshold time limit.

In the event that the security check passes, at 442, the server 402 sends security check pass information to the terminal. The security check pass information can indicate that the terminal has passed the security check. In the event that the security check passes, the security check process can end.

As can be seen from the example described above, a two-dimensional verification code can be used to transmit verification information during a security check. A two-dimensional verification code can transmit richer and more reliable confirmation information than some related art that uses a security check implemented through a text message containing written numerals. According to various embodiments, the confirmation information is difficult to steal and use and thus enhances the access security of Internet applications. In some embodiments, the two-dimensional verification code is transmitted via Internet traffic and thus avoids the communication charges that arise when verification codes are transmitted via text messages. As a result, in various embodiments, there is a reduction in mobile communication resources required to perform a security check. According to some embodiments, in response to the terminal recognizing the two-dimensional verification code, the terminal can automatically send back recognition information to the server. Accordingly, the security check process according to various embodiments does not require manual entry by the user and avoids the possibility of confirmation information from manual fraud. In addition, security check efficiency is effectively raised because the terminal can implement a first re-verification in the security check process by confirming the terminal identifier.

Figure 5:
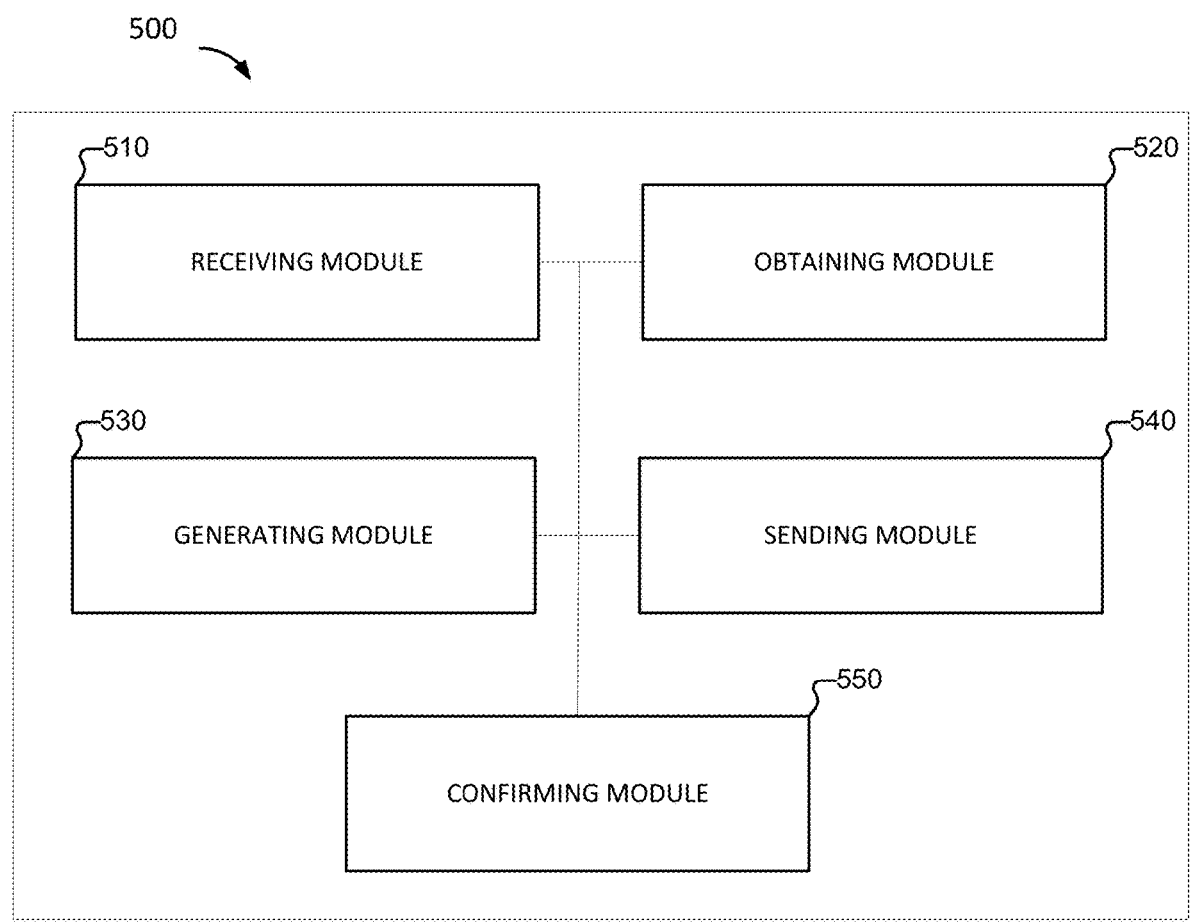
FIG. 5 is a block diagram of a security verifying device according to various embodiments of the present disclosure of the present application.

FIG. 5 is a block diagram of a security verifying device according to various embodiments of the present disclosure of the present application.

Referring to FIG. 5, a device 500 for performing a security check is provided. In some embodiments, device 500 can implement some or all of process 200 of FIG. 2. In some embodiments, device 500 can implement some or all of process 300 of FIG. 3. In some embodiments, device 500 can implement some or all of process 400 of FIG. 4. In some embodiments, device 500 can be implemented by terminal 1000 of FIG. 10. In some embodiments, device 500 can be implemented by system 1100 of FIG. 11.

In some embodiments, the device 500 can be implemented in a server. The device 500 can include a receiving module 510, an obtaining module 520, a generating module 530, a sending module 540, and a confirming module 550.

The receiving module 510 can be configured to receive a security verification request sent from a terminal.

The obtaining module 520 can be configured to obtain a first verification element information according to the security verification request received by the receiving module 510.

The generating module 530 can be configured to use first verification element information obtained by the obtaining module 520 as a basis for generating a digital object unique identifier.

The sending module 540 can be configured to send the digital object unique identifier generated by the generating module 530. The sending module 540 can send the digital object unique identifier to the terminal.

The receiving module 510 can be further configured to receive second verification element information sent by the terminal. The second verification element information can correspond to verification element information obtained by the terminal using the digital object unique identifier sent by the sending module 540.

The confirming module 550 can be configured to send a result of a security check. For example, upon confirming that the first verification element information obtained by the obtaining module 520 and the second verification element information received by the receiving unit are in agreement (e.g., consistent), the confirming module 550 can send security check passed information back to the terminal.

Figure 6:
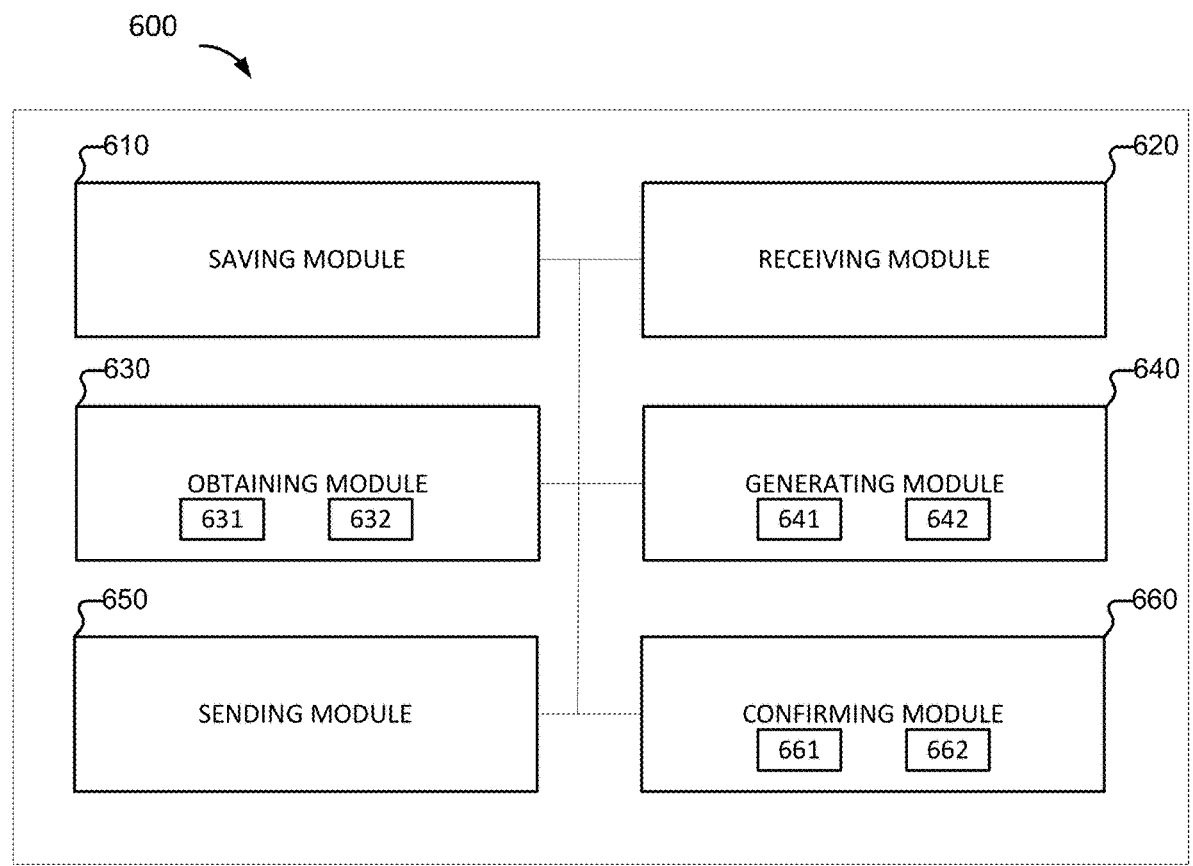
FIG. 6 is a block diagram of a security verifying device according to various embodiments of the present disclosure of the present application.

FIG. 6 is a block diagram of a security verifying device according to various embodiments of the present disclosure of the present application.

Referring to FIG. 6, a device 600 for performing a security check is provided. In some embodiments, device 600 can implement some or all of process 200 of FIG. 2. In some embodiments, device 600 can implement some or all of process 300 of FIG. 3. In some embodiments, device 600 can implement some or all of process 400 of FIG. 4. In some embodiments, device 600 can be implemented by terminal 1000 of FIG. 10. In some embodiments, device 600 can be implemented by system 1100 of FIG. 11.

In some embodiments, the device 600 can be implemented in a server. The device 600 can include a saving module 610, a receiving module 620, an obtaining module 630, a generating module 640, a sending module 650, and a confirming module 660.

The saving module 610 can be configured to store a mapping between a user identifier and a terminal identifier. The saving module 610 can store the mapping in a table, a database, or the like. The saving module 610 can update the mapping in the event that a user registers a username or changes a registration in a record corresponding to an existing username.

The receiving module 620 can be configured to receive a security verification request sent from a terminal.

The obtaining module 630 can include an identifier searching sub-module 631 and an information generating sub-module 632.

The identifier searching sub-module 631 can be configured to use the username associated with the terminal as a basis for searching the mappings saved by the saving module 610 and for obtaining a first terminal identifier corresponding to a terminal associated with the username of the terminal. The username associated with the terminal can be carried in the security verification request received by the receiving module 620.

The information generating sub-module 632 can be configured to generate a first security verification code and a first timestamp. The information generating sub-module 632 can generate the first security verification code and the first timestamp in connection with the security verification request received by the receiving module 620. The first timestamp can indicate the time limit on the present security check. The first verification element information can include the first terminal identifier, the first security verification code, and the first timestamp.

The saving module 610 can be further configured to save the relationships between the first terminal identifier obtained by the identifier searching sub-module 631 and the first security verification code and the first timestamp that are generated by the information generating sub-module 632.

The generating module 640 can include a character string generating sub-module 641 and an identifier generating sub-module 642.

The character string generating sub-module 641 can be configured to generate a first combination character string. The character string generating sub-module 641 can be configured to generate the first combination character string by combining the first terminal identifier obtained by the identifier searching sub-module 631 and the first security verification code and the first timestamp that are generated by the information generating sub-module 632.

The identifier generating sub-module 642 can be configured to use the first combination character string generated by the character string generating sub-module 641 to generate a digital object unique identifier.

The sending module 650 can be configured to send the digital object unique identifier generated by the identifier generating sub-module 642 to the terminal.

The receiving module 620 can be further configured to receive second verification element information sent by the terminal. The second verification element information can correspond to verification element information obtained by the terminal using the digital object unique identifier sent by the sending module 650. The second verification element information received by the receiving unit 620 can include a second terminal identifier, a second security verification code, and a second timestamp that are obtained by decomposing a second combination character string. The second combination character string can be obtained by the terminal by scanning the digital object unique identifier. The terminal can send the second verification element information back in the event that the terminal compared the second terminal identifier to the terminal identifier of the terminal and determined the second terminal identifier to match (e.g., be the same) the terminal identifier of the terminal.

The confirming module 660 can include an information searching sub-module 661 and a confirmation executing sub-module 662.

The information searching sub-module 661 can be configured to search relationships (e.g., records of relationships) saved by the saving module 610 and to obtain the security verification code and timestamp that respectively correspond to the second terminal identifier in the second verification element information received by the receiving module 620.

The confirmation executing sub-module 662 can be configured to send an indication of a result of the result of the security check. The confirmation executing sub-module 662 can determine whether the second security verification code and the security verification code obtained by the information searching sub-module 661 match (e.g., are the same), whether the second timestamp and the timestamp obtained by the information searching sub-module 661 match (e.g., are the same), and that the second timestamp is within the time limit of the present security check. In the event that the confirmation executing sub-module 662 determines that the second security verification code and the security verification code obtained by the information searching sub-module 661 match (e.g., are the same), that the second timestamp and the timestamp obtained by the information searching sub-module 661 match (e.g., are the same), and that the second timestamp is within the time limit of the present security check, the confirmation executing sub-module 662 sends security check pass information back to the terminal.

In some embodiments, the identifier generating sub-module 642 is configured to encrypt the first combination character string generated by the character string generating sub-module 641 to generate an encrypted character string and to convert the encrypted character string to a base 64 character string. The identifier generating sub-module 642 can be configured to encode the base 64 character string according to a QR encoding rule and to generate a two-dimensional verification code, which corresponds to the digital object unique identifier.

Figure 7:
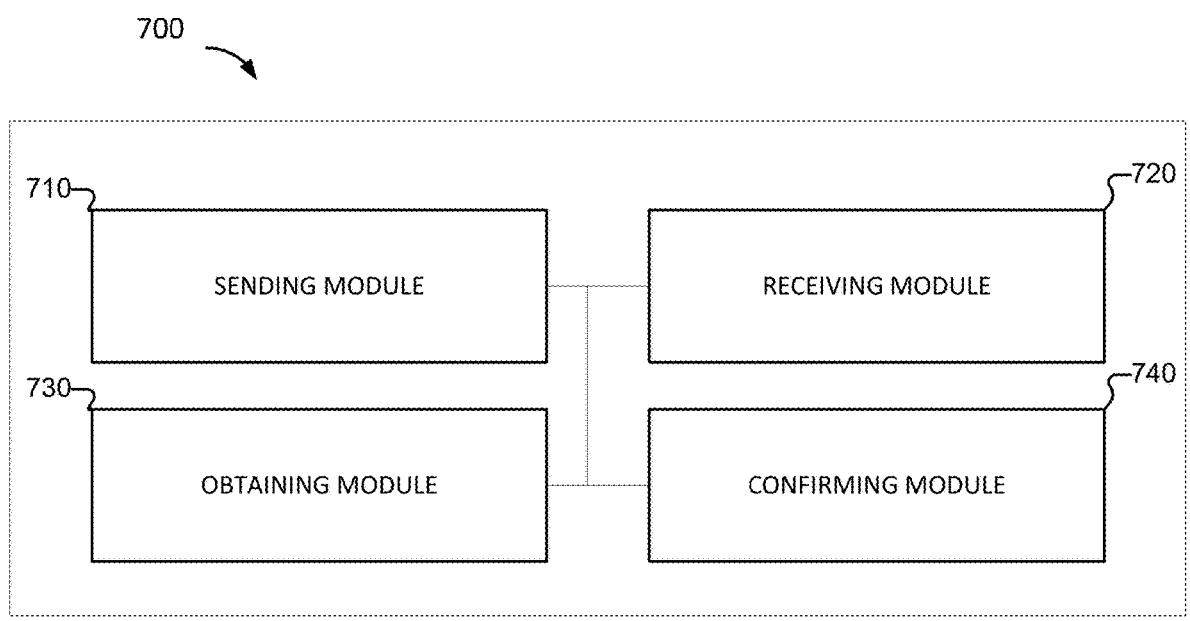
FIG. 7 is a block diagram of a security verifying device according to various embodiments of the present disclosure of the present application.

FIG. 7 is a block diagram of a security verifying device according to various embodiments of the present disclosure of the present application.

Referring to FIG. 7, a device 700 for performing a security check is provided. In some embodiments, device 700 can implement some or all of process 200 of FIG. 2. In some embodiments, device 700 can implement some or all of process 300 of FIG. 3. In some embodiments, device 700 can implement some or all of process 400 of FIG. 4. In some embodiments, device 700 can be implemented by terminal 1000 of FIG. 10. In some embodiments, device 700 can be implemented by system 1100 of FIG. 11.

The device 700 can be implemented in a terminal. The device 700 can include a sending module 710, a receiving module 720, an obtaining module 730, and a confirming module 740.

The sending module 710 can be configured to send a security verification request to a server.

The receiving module 720 can be configured to receive a digital object unique identifier sent by the server. The digital object unique identifier can be a unique identifier generated according to (e.g., based at least in part on) first verification element information after the server has obtained the first verification element information in accordance with the security verification request sent by the sending module 710.

The obtaining module 730 can be configured to obtain second verification element information using the digital object unique identifier received by the receiving unit 720.

The sending module 710 can be further configured to send the second verification element information obtained by the obtaining module 730 to the server.

The confirming module 740 can be configured to receive a result of the security check. The confirming module 740 can receive security check pass information sent by the server. The server can send the security check pass information in the event that the server confirms that the first verification element information and the second verification element information sent by the sending module 710 are in agreement.

Figure 8:
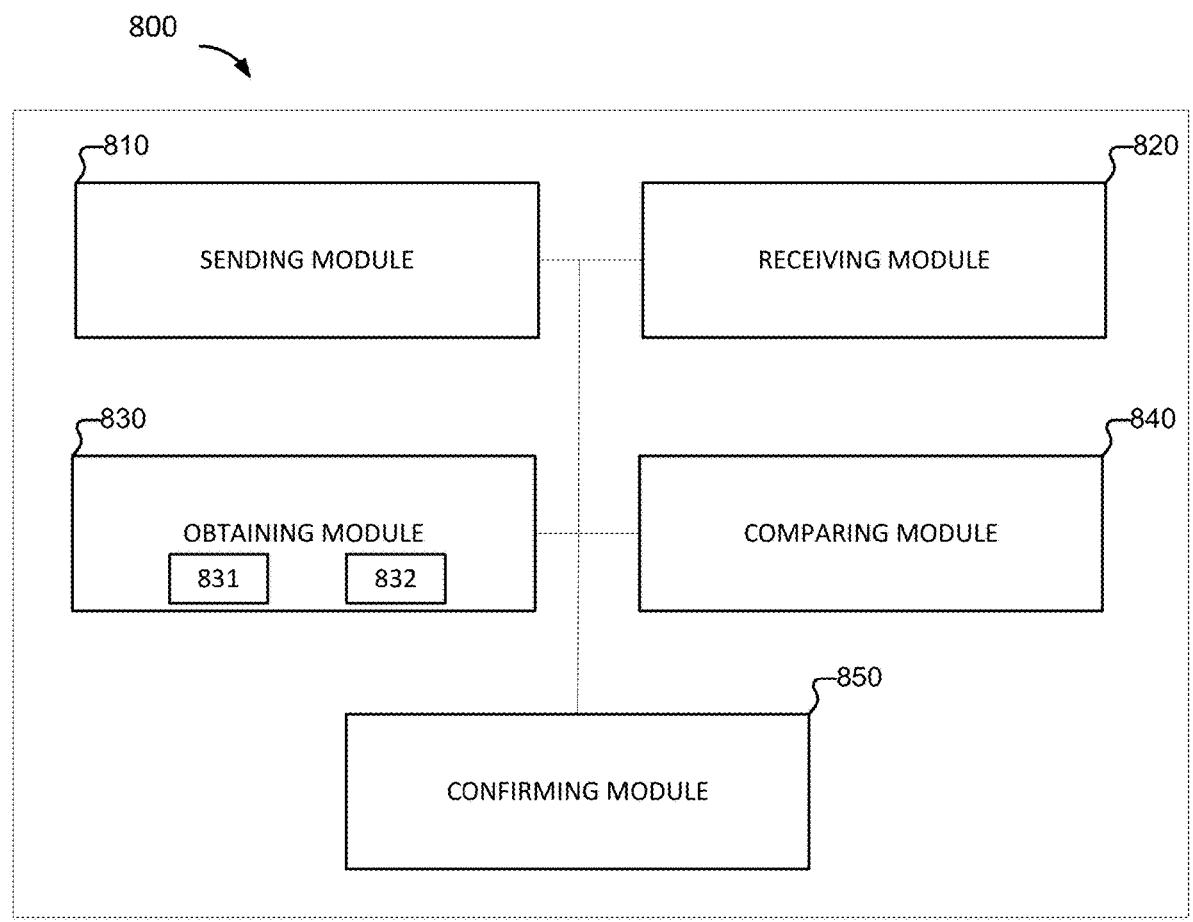
FIG. 8 is a block diagram of a security verifying device according to various embodiments of the present disclosure of the present application.

FIG. 8 is a block diagram of a security verifying device according to various embodiments of the present disclosure of the present application.

Referring to FIG. 8, a device 800 for performing a security check is provided. In some embodiments, device 800 can implement some or all of process 200 of FIG. 2. In some embodiments, device 800 can implement some or all of process 300 of FIG. 3. In some embodiments, device 800 can implement some or all of process 400 of FIG. 4. In some embodiments, device 800 can be implemented by terminal 1000 of FIG. 10. In some embodiments, device 800 can be implemented by system 1100 of FIG. 11.

The device 800 can be implemented in a terminal. The device 800 can include a sending module 810, a receiving module 820, an obtaining module 830, a comparing module 840, and a confirming module 850.

The sending module 810 can be configured to send a security verification request to a server.

The receiving module 820 can be configured to receive a digital object unique identifier sent by the server. The digital object unique identifier can correspond to a unique identifier generated according to (e.g., based at least in part on) first verification element information after the server has obtained the first verification element information in accordance with the security verification request sent by the sending module 810.

The obtaining module 830 can include an identifier scanning sub-module 831 and a character string decomposing sub-module 832.

The identifier scanning sub-module 831 can obtain a second combination character string by scanning the digital object unique identifier received by the receiving module 820. The digital object unique identifier can correspond to a digital object unique identifier generated from a first combination character string. The first combination character string can be generated by the server by combining a first terminal identifier, a first security verification code, and a first timestamp. The first verification element information can include the first terminal identifier, the first security verification code, and the first timestamp. The first terminal identifier can correspond to the terminal identifier of the terminal. The first terminal identifier can be obtained according to the terminal username carried in the security verification request. The first security verification code and the first timestamp can respectively correspond to the security verification code and the timestamp that are generated by the server in connection with the security verification request.

The character string decomposing sub-module 832 can be configured to decompose the second combination character string obtained by the identifier scanning sub-module 831. The character string decomposing sub-module 832 can be configured to obtain the second verification element information by decomposing the second combination character string. The second verification element information can include a second terminal identifier, a second security verification code, and a second timestamp.

The comparing module 840 can be configured to compare the second terminal identifier obtained by the character string decomposing sub-module 832 and the terminal identifier of the terminal.

The sending module 810 can be further configured to send second verification element information to the server. For example, the sending module can send the second verification element information to the server in the event that the comparison result from the comparing module 840 indicates that the second terminal identifier and the terminal identifier of the terminal match (e.g., are the same).

The confirming module 850 can be configured to receive a result of the security check. The confirming module 850 can receive security check pass information sent by the server. The server can send the security check pass information in the event that the server confirms that the first verification element information and the second verification element information sent by the sending module 810 are in agreement.

In some embodiments, the identifier scanning sub-module 831 can be configured to decode, in accordance with a QR decoding rule, the two-dimensional verification code that corresponds to the digital object unique identifier and that was received by the receiving unit 820. The identifier scanning sub-module 831 can be further configured to generate a base 64 character string, to convert the base 64 character string to an encrypted character string, and to decrypt the encrypted character string to obtain the second combination character string.

The modules described above in connection with FIGS. 5-8 can be separate components that may or may not be physically separate. The modules can be located in one place, or the modules can be distributed across multiple network units. The schemes of the present application can be realized by selecting part or all of the modules in accordance with actual need.

Figure 9:
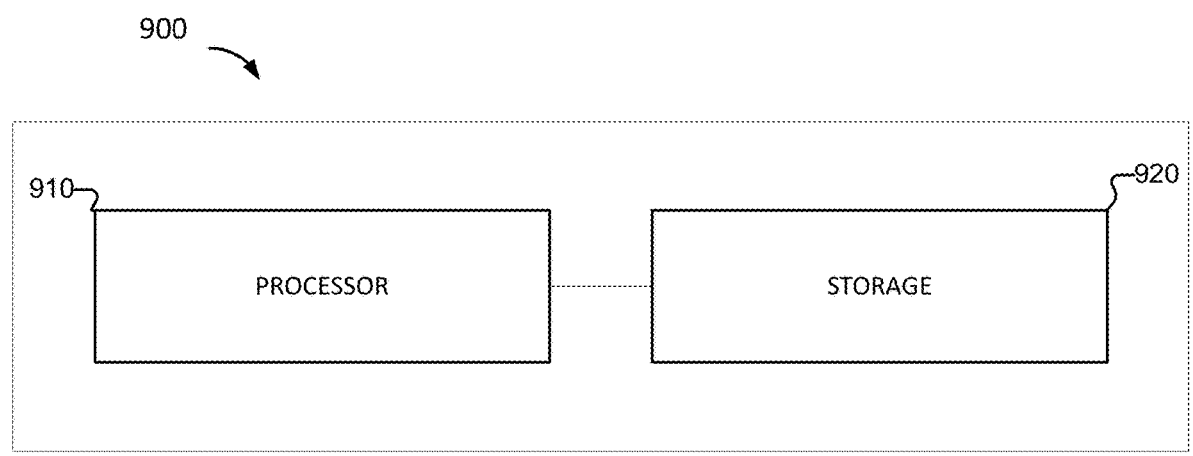
FIG. 9 is a block diagram of an embodiment of a server according to various embodiments of the present disclosure of the present application.

FIG. 9 is a block diagram of an embodiment of a server according to various embodiments of the present disclosure of the present application.

Referring to FIG. 9, a server 900 for performing a security check is provided. In some embodiments, server 900 can implement some or all of process 200 of FIG. 2. In some embodiments, server 900 can implement some or all of process 300 of FIG. 3. In some embodiments, server 900 can implement some or all of process 400 of FIG. 4. In some embodiments, server 900 can be implemented by terminal 1000 of FIG. 10. In some embodiments, server 900 can be implemented by system 1100 of FIG. 11.

The server 900 can include a processor 910, a storage device 920 for storing commands executable by the processor 910, an input/output interface (not shown), an Internet interface (not shown), and various hardware (not shown).

The processor 910 can be configured to receive a security verification request sent from a terminal, to obtain first verification element information according to the security verification request, to use the first verification element information as a basis for generating a digital object unique identifier, to send the digital object unique identifier to the terminal, and to receive second verification element information sent by the terminal. The second verification element information can correspond to verification element information obtained by the terminal through (e.g., using) the digital object unique identifier.

In some embodiments, the processor 910 can be configured to send an indication of a result of the result of the security check. The processor 910 can determine whether the first verification element information and the second verification element information are in agreement (e.g., match). In the event that the processor 910 determines that the first verification element information and the second verification element information are in agreement (e.g., match), the processor 910 sends security check pass information to the terminal.

The storage device 920 can store a mapping between a user identifier and a terminal identifier. The storage device 920 can store the mapping between the user identifier and the terminal identifier in a table, a database, the like, or any combination thereof. The storage device 920 can store a relationship between the first terminal identifier, the first security verification code, and the first timestamp.

Figure 10:
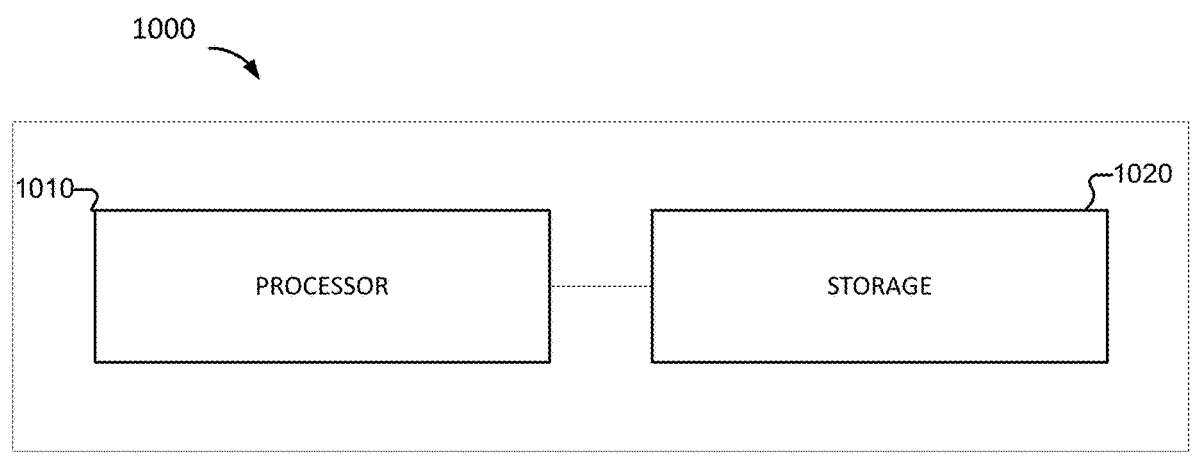
FIG. 10 is a block diagram of a terminal according to various embodiments of the present disclosure of the present application.

FIG. 10 is a block diagram of a terminal according to various embodiments of the present disclosure of the present application.

Referring to FIG. 10, a terminal 1000 for performing a security check is provided. In some embodiments, terminal 1000 can implement some or all of process 200 of FIG. 2. In some embodiments, terminal 1000 can implement some or all of process 300 of FIG. 3. In some embodiments, terminal 1000 can implement some or all of process 400 of FIG. 4. In some embodiments, terminal 1000 can be implemented by system 1100 of FIG. 11.

The terminal 1000 can include a processor 1010, a storage device 1020 that stores commands executable by the processor 1010, an input/output interface (not shown), an Internet interface (not shown), and various hardware (not shown).

The processor 1010 can be configured to send a security verification request to a server. The processor 1010 can be further configured to receive a digital object unique identifier sent back by the server. The digital object unique identifier can correspond to a unique identifier generated according to first verification element information after the server has obtained the first verification element information in accordance with the security verification request. The processor 1010 can be further configured to obtain second verification element information through the digital object unique identifier. The processor 1010 can be further configured to send the second verification element information to the server.

In some embodiments, the processor 1010 can be configured to receive a result of the security check. The processor 1010 can receive security check pass information sent by the server. The server can send the security check pass information in the event that the server confirms that the first verification element information and the second verification element information are in agreement.

The storage device 1020 can store an identifier. For example, the identifier can correspond to a username, a terminal identifier, the like, or any combination thereof.

The digital object unique identifier can be used to transmit verification information during a security check. Richer and more reliable confirmation information can be transmitted in connection with a digital object unique identifier than in a security check according to some related art that implements a text message including written numerals. In some embodiments, the confirmation information transmitted in connection with the digital object unique identifier is relatively difficult to steal and use. Accordingly, the access security of Internet applications can be enhanced by using digital object unique identifiers in the communication of the confirmation information rather than text messages in connection with the communication of written numerals. According to various embodiments, the digital object unique identifier is transmitted via Internet traffic and thus avoids the communication charges that arise when verification codes are transmitted via text messages. As a result, in various embodiments, there is a reduction in mobile communication resources required to perform a security check. According to some embodiments, in response to the terminal recognizing the digital object unique identifier or information included in the digital object unique identifier, the terminal can automatically send back recognition information to the server. Accordingly, the security check process according to various embodiments does not require manual entry by the user and avoids the possibility of confirmation information from manual fraud. In addition, security check efficiency is effectively raised because the terminal can implement a first re-verification in the security check process by confirming the terminal identifier.

Figure 11:
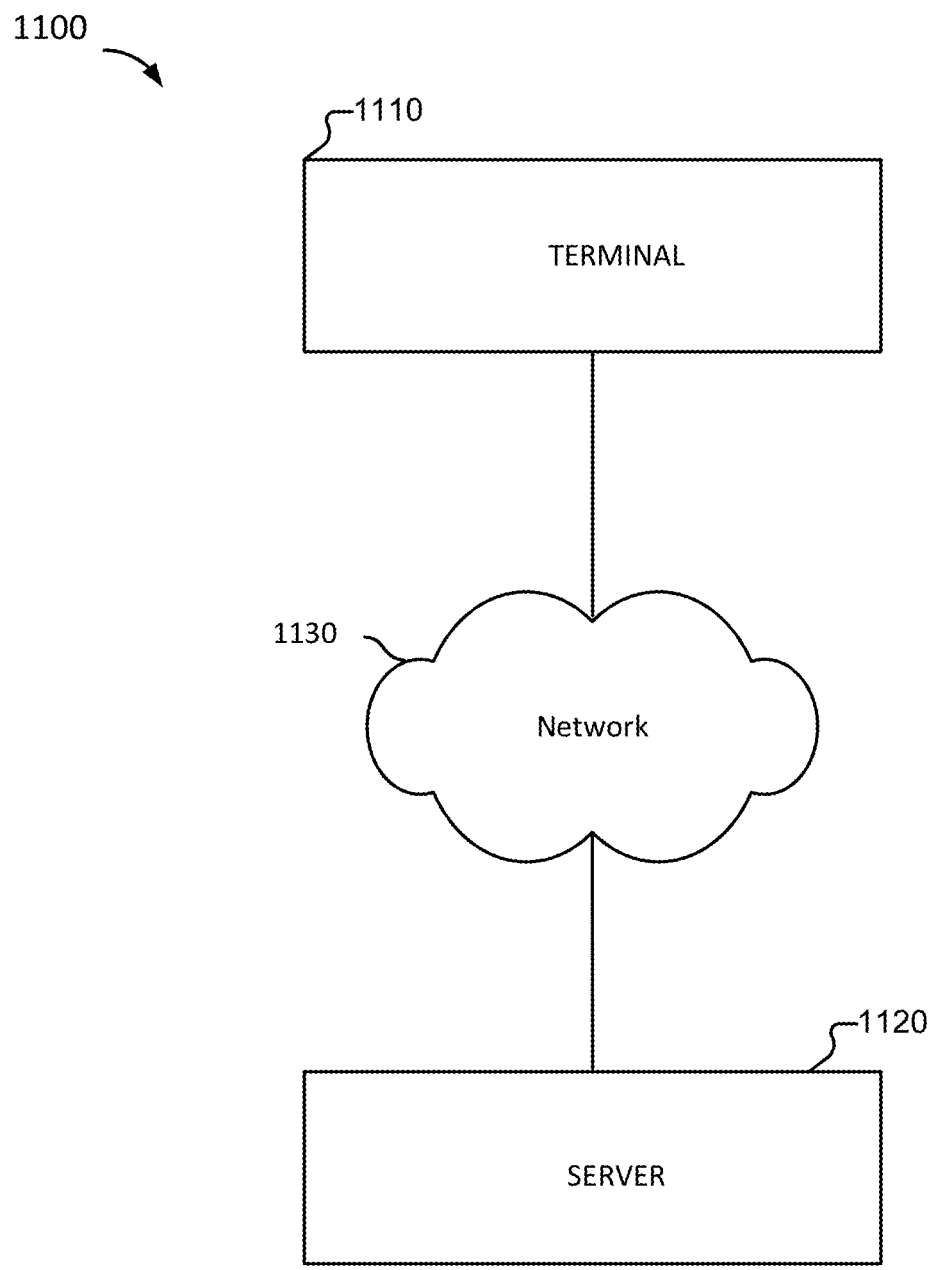
FIG. 11 is a structural block diagram of a system for providing security according to various embodiments of the present application.

FIG. 11 is a structural block diagram of a system for providing security according to various embodiments of the present application.

Referring to FIG. 11, a system 1100 for providing security is provided. In some embodiments, system 1100 can implement some or all of process 200 of FIG. 2. In some embodiments, system 1100 can implement some or all of process 300 of FIG. 3. In some embodiments, system 1100 can implement some or all of process 400 of FIG. 4. In some embodiments, device 500 of FIG. 5 can be implemented by system 1100. In some embodiments, device 600 of FIG. 6 can be implemented by system 1100. In some embodiments, device 700 of FIG. 7 can be implemented by system 1100. In some embodiments, device 800 of FIG. 8 can be implemented by system 1100. In some embodiments, server 900 of FIG. 9 can be implemented by system 1100. In some embodiments, terminal 1000 of FIG. 10 can be implemented by system 1100.

The system 1100 for providing a security check includes a terminal 1110 and a server 1120. The system 1100 can include a network 1130 over which the terminal 1110 and the server 1120 communicate. In response to receiving a security verification request from the terminal 1110, the server 1120 can provide a security check of the terminal 1110 (e.g., the user using, or otherwise associated with, the terminal 1110).

Figure 12:
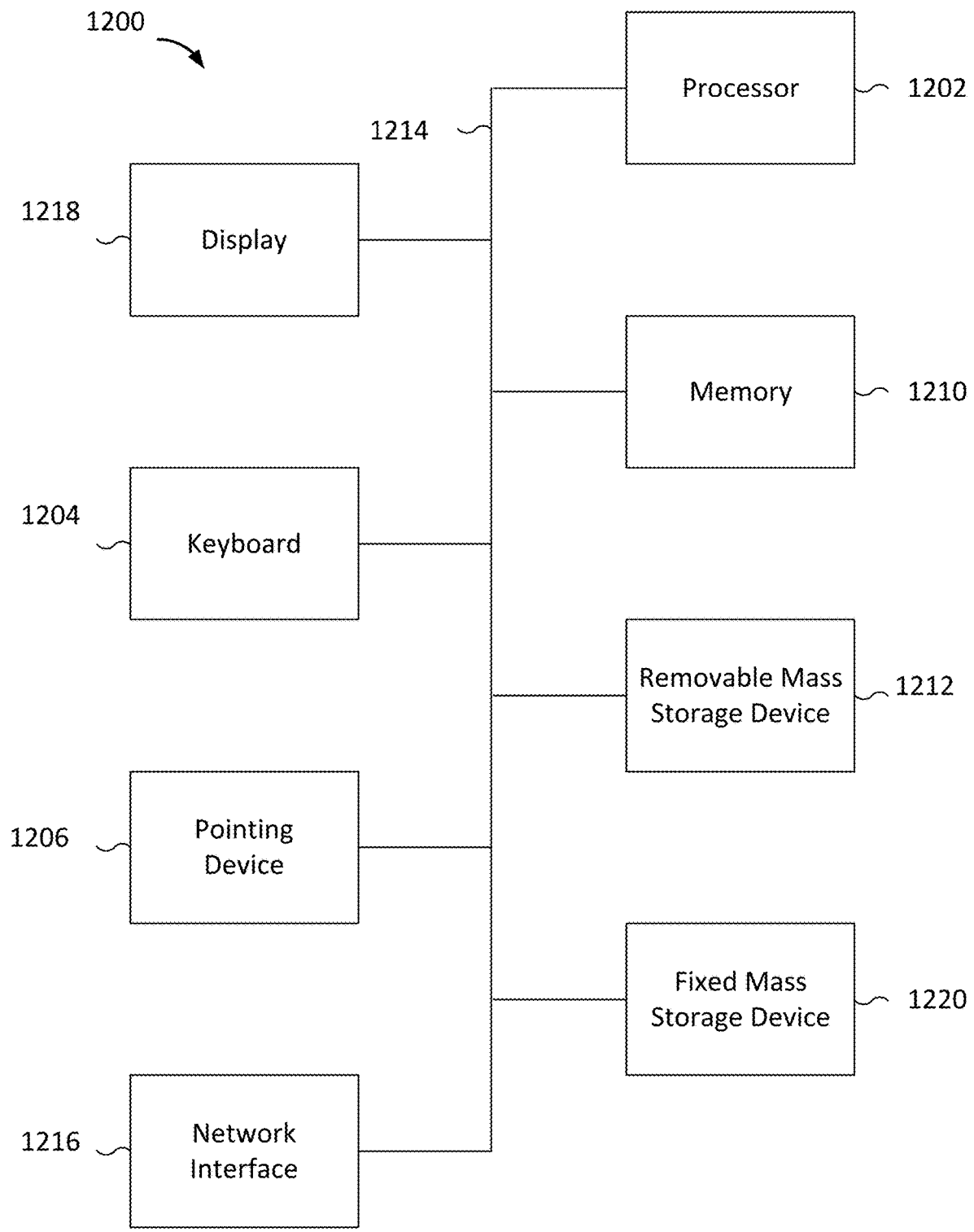
FIG. 12 is a functional diagram of a computer system for providing security according to various embodiments of the present application.

FIG. 12 is a functional diagram of a computer system for providing security according to various embodiments of the present application.

Referring to FIG. 12, a computer system 1200 for providing security is provided. As will be apparent, other computer system architectures and configurations can be used to provide security. Computer system 1200, which includes various subsystems as described below, includes at least one microprocessor subsystem (also referred to as a processor or a central processing unit (CPU)) 1202. For example, processor 1202 can be implemented by a single-chip processor or by multiple processors. In some embodiments, processor 1202 is a general purpose digital processor that controls the operation of the computer system 1200. Using instructions retrieved from memory 1210, the processor 1202 controls the reception and manipulation of input data, and the output and display of data on output devices (e.g., display 1218).

Processor 1202 is coupled bi-directionally with memory 1210, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1202. Also as is well known in the art, primary storage typically includes basic operating instructions, program code, data, and objects used by the processor 1202 to perform its functions (e.g., programmed instructions). For example, memory 1210 can include any suitable computer-readable storage media, described below, depending on whether, for example, data access needs to be bi-directional or uni-directional. For example, processor 1202 can also directly and very rapidly retrieve and store frequently needed data in a cache memory (not shown). The memory can be a non-transitory computer-readable storage medium.

A removable mass storage device 1212 provides additional data storage capacity for the computer system 1200, and is coupled either bi-directionally (read/write) or uni-directionally (read only) to processor 1202. For example, storage 1212 can also include computer-readable media such as magnetic tape, flash memory, PC-CARDS, portable mass storage devices, holographic storage devices, and other storage devices. A fixed mass storage 1220 can also, for example, provide additional data storage capacity. The most common example of mass storage 1220 is a hard disk drive. Mass storage device 1212 and fixed mass storage 1220 generally store additional programming instructions, data, and the like that typically are not in active use by the processor 1202. It will be appreciated that the information retained within mass storage device 1212 and fixed mass storage 1220 can be incorporated, if needed, in standard fashion as part of memory 1210 (e.g., RAM) as virtual memory.

In addition to providing processor 1202 access to storage subsystems, bus 1214 can also be used to provide access to other subsystems and devices. As shown, these can include a display monitor 1218, a network interface 1216, a keyboard 1204, and a pointing device 1206, as well as an auxiliary input/output device interface, a sound card, speakers, and other subsystems as needed. For example, the pointing device 1206 can be a mouse, stylus, track ball, or tablet, and is useful for interacting with a graphical user interface.

The network interface 1216 allows processor 1202 to be coupled to another computer, computer network, or telecommunications network using a network connection as shown. For example, through the network interface 1216, the processor 1202 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1202 can be used to connect the computer system 1200 to an external network and transfer data according to standard protocols. For example, various process embodiments disclosed herein can be executed on processor 1202, or can be performed across a network such as the Internet, intranet networks, or local area networks, in conjunction with a remote processor that shares a portion of the processing. Additional mass storage devices (not shown) can also be connected to processor 1202 through network interface 1216.

An auxiliary I/O device interface (not shown) can be used in conjunction with computer system 1200. The auxiliary I/O device interface can include general and customized interfaces that allow the processor 1202 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 12 is but an example of a computer system suitable for use with the various embodiments disclosed herein. Other computer systems suitable for such use can include additional or fewer subsystems. In addition, bus 1214 is illustrative of any interconnection scheme serving to link the subsystems. Other computer architectures having different configurations of subsystems can also be utilized.

The above-stated are merely embodiments of the present application and do not limit the present application. For persons skilled in the art, the present application may have various modifications and variations. Any modification, equivalent substitution, or improvement made in keeping with the spirit and principles of the present application shall be included within the scope of the claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving, by a server, a security verification request sent from a terminal, the security verification request comprising an identifier associated with a user;
   obtaining, by the server, an identifier associated with the terminal based at least in part on the identifier associated with the user, wherein the identifier associated with the terminal is obtained in connection with the receiving of the security verification request;
   obtaining, by the server, first verification element information based at least in part on the security verification request, or the identifier associated with the terminal or the user of the terminal;
   generating, by the server, a digital object identifier based at least in part on the first verification element information;
   sending, by the server, the digital object identifier to the terminal;
   receiving, by the server, second verification element information from the terminal, wherein the second verification element information is determined by the terminal based at least in part on information extracted by the terminal from the digital object identifier; and
   authenticating the terminal in response to a determination that the first verification element information and the second verification element information match, and a determination that a second timestamp included in the second verification element information is within a predefined time limit of a security check associated with the security verification request.

2. The method of claim 1, wherein the digital object identifier is a unique identifier.

3. The method of claim 1, wherein the identifier associated with the terminal or a user of the terminal is comprised in the security verification request.

4. The method of claim 1, wherein the authenticating of the terminal comprises granting to the terminal access to one or more network resources.

5. The method of claim 1, wherein the second verification element information corresponds to information determined by the terminal from the digital object identifier, the determined information corresponding to the first verification element information.

6. The method of claim 1, wherein the terminal obtains the second verification element information by processing the digital object identifier.

7. The method of claim 1, further comprising:
   determining whether the first verification element information and the second verification element information match.

8. The method of claim 1, wherein the generating of the digital object identifier based at least in part on the first verification element information comprises:
   generating a first combination character string by combining a first terminal identifier, a first security verification code, and a first timestamp associated with the security verification request, wherein the first security verification code is obtained based at least in part on the security verification request, and the identifier associated with the terminal or the user of the terminal, and generating the digital object identifier based at least in part on the first combination character string.

9. The method of claim 1, wherein the generating of the digital object identifier based at least in part on the first verification element information comprises:
generating an encrypted character string based at least in part on encrypting the first combination character string;
converting the encrypted character string to a base 64 character string;
encoding the base 64 character string according to a Quick Response (QR) encoding rule; and
generating a two-dimensional verification code, wherein the two-dimensional verification code corresponds to the digital object identifier.

10. The method of claim 1, wherein the second verification element information is sent by the terminal in response to the terminal obtaining the identifier associated with the terminal from the digital object identifier, and determining that the identifier associated with the terminal obtained from the digital object identifier corresponds to the terminal.

11. The method of claim 1, further comprising:
saving relationships among a first terminal identifier, a first security verification code, and a first timestamp, wherein the first terminal identifier is determined based at least in part on the identifier associated with the terminal or the user of the terminal, and the first security verification code is obtained based at least in part on the security verification request and the first timestamp,
wherein the second verification element information comprises: a second terminal identifier, a second security verification code, and the second timestamp that are obtained by decomposing a second combination character string, wherein the second combination character string is obtained by the terminal scanning the digital object identifier, and wherein the second verification element information corresponds to information sent from the terminal in response to a determination that the terminal has compared the second terminal identifier with the first terminal identifier of the terminal and determined the second terminal identifier and the first terminal identifier of the terminal match; and
wherein the authenticating the terminal comprises:
searching, based at least in part on the second terminal identifier, a plurality of relationships among a plurality of first terminal identifiers, a plurality of first security verification codes, and a plurality of first timestamps, and obtaining the security verification code and the timestamp respectively corresponding to the second terminal identifier; and
in response to a determination that the second security verification code and the obtained security verification code match, the second timestamp and the obtained timestamp match, and the second timestamp is within a time limit of a present security check associated with the security verification request, determining that the terminal is authenticated.

12. The method of claim 1, wherein the second verification element information comprises the identifier associated with the terminal, and the second verification element information is sent to a server from the terminal.

13. A device, comprising:
at least one processor configured to:
receive a security verification request sent from a terminal, the security verification request comprising an identifier associated with a user;
obtain an identifier associated with the terminal based at least in part on the identifier associated with the user, wherein the identifier associated with the terminal is obtained in connection with the receiving of the security verification request;
obtain first verification element information based at least in part on the security verification request, or the identifier associated with the terminal or the user of the terminal;
generate a digital object identifier based at least in part on the first verification element information;
send the digital object identifier to the terminal;
receive second verification element information from the terminal, wherein the second verification element information is determined by the terminal based at least in part on information extracted by the terminal from the digital object identifier; and
authenticate the terminal in response to a determination that the first verification element information and the second verification element information match, and a determination that a second timestamp included in the second verification element information is within a predefined time limit of a security check associated with the security verification request; and
a memory coupled to the at least one processor and configured to provide the at least one processor with instructions.

14. A computer program product, the computer program product being embodied in a non-transitory computer readable storage medium and comprising computer instructions for:
receiving a security verification request sent from a terminal, the security verification request comprising an identifier associated with a user;
obtaining an identifier associated with the terminal based at least in part on the identifier associated with the user, wherein the identifier associated with the terminal is obtained in connection with the receiving of the security verification request;
obtaining first verification element information based at least in part on the security verification request, or the identifier associated with the terminal or the user of the terminal;
generating a digital object identifier based at least in part on the first verification element information;
sending the digital object identifier to the terminal;
receiving second verification element information from the terminal, wherein the second verification element information is determined by the terminal based at least in part on information extracted by the terminal from the digital object identifier; and
authenticating the terminal in response to a determination that the first verification element information and the second verification element information match, and a determination that a second timestamp included in the second verification element information is within a predefined time limit of a security check associated with the security verification request.

* * * * *

UNITED STATES PATENT AND TRADEMARK OFFICE
CERTIFICATE OF CORRECTION

PATENT NO. : 10,798,081 B2
APPLICATION NO. : 16/171186
DATED : October 6, 2020
INVENTOR(S) : Jinggang Feng Page 1 of 1

It is certified that error appears in the above-identified patent and that said Letters Patent is hereby corrected as shown below:

In the Claims

Column 27, Line 7 & 8, Claim 9, delete "first combination character string" and insert --first verification element information--, therefor.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*